US012515678B2

(12) United States Patent
Wang et al.

(10) Patent No.: US 12,515,678 B2
(45) Date of Patent: Jan. 6, 2026

(54) PERSONALIZED VEHICLE LANE CHANGE MANEUVER PREDICTION

(71) Applicant: TOYOTA MOTOR ENGINEERING & MANUFACTURING NORTH AMERICA, INC., Plano, TX (US)

(72) Inventors: Ziran Wang, San Jose, CA (US); Kyungtae Han, Palo Alto, CA (US); Rohit Gupta, Santa Clara, CA (US); Prashant Tiwari, Santa Clara, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 737 days.

(21) Appl. No.: 17/715,011

(22) Filed: Apr. 6, 2022

(65) Prior Publication Data

US 2023/0322234 A1 Oct. 12, 2023

(51) Int. Cl.
*B60W 40/09* (2012.01)
*B60W 30/12* (2020.01)
(Continued)

(52) U.S. Cl.
CPC ............ *B60W 40/09* (2013.01); *B60W 30/12* (2013.01); *B60W 50/10* (2013.01);
(Continued)

(58) Field of Classification Search
CPC ...... B60W 40/09; B60W 30/12; B60W 50/10; B60W 2540/30; B60W 2552/53;
(Continued)

(56) References Cited

U.S. PATENT DOCUMENTS 10,671,076 B1 * 6/2020 Kobilarov .............. G08G 1/166
10,940,863 B2 3/2021 Palanisamy
(Continued)

FOREIGN PATENT DOCUMENTS

| CN | 109229108 A | * | 1/2019 | ............ B60W 40/09 |
| CN | 111114556 A | | 5/2020 | |
| EP | 3483689 A1 | * | 5/2019 | ............ B60W 30/14 |

OTHER PUBLICATIONS

Translation CN109229108A (Year: 2020).*
(Continued)

*Primary Examiner* — Frederick M Brushaber
(74) *Attorney, Agent, or Firm* — SHEPPARD, MULLIN, RICHTER & HAMPTON LLP; Daniel N. Yannuzzi

(57) ABSTRACT

A learning-based lane change prediction algorithm, and systems and methods for implementing the algorithm, are disclosed. The prediction algorithm evaluates the driving behaviors of a target human driver and predicts lane change maneuvers based on those personalized driving behaviors. The algorithm may include an online lane change decision prediction phase and an offline prediction training and cost function recovery phase. During the offline training phase, a machine learning model may be trained based on historical vehicle states. During the online validation phase, driving data may be collected and fed to the trained model to predict a driver's lane change maneuver, identify potential vehicle trajectories, and determine a most probable vehicle trajectory based on a driver's cost function recovered during the offline phase.

20 Claims, 10 Drawing Sheets

(51) Int. Cl.
B60W 50/10 (2012.01)
G06F 18/214 (2023.01)

(52) U.S. Cl.
CPC ..... G06F 18/2155 (2023.01); B60W 2540/30 (2013.01); B60W 2552/53 (2020.02); B60W 2554/4045 (2020.02)

(58) Field of Classification Search
CPC ..... B60W 2554/4045; B60W 60/00274; G06F 18/2155; G06F 18/214
See application file for complete search history.

(56) References Cited

U.S. PATENT DOCUMENTS

| | | | |
|---|---|---|---|
| 11,151,880 | B1 | 10/2021 | Shou |
| 2020/0139973 | A1 | 5/2020 | Palanisamy |
| 2020/0307691 | A1* | 10/2020 | Kalabic ............. B62D 15/0255 |
| 2020/0363800 | A1 | 11/2020 | Jojo-Verge |
| 2020/0380354 | A1* | 12/2020 | Zhao .................... G06N 3/049 |
| 2021/0248460 | A1 | 8/2021 | Sykora |
| 2021/0387652 | A1 | 12/2021 | Shou |
| 2023/0060164 | A1* | 3/2023 | Wang ................ H04W 36/0011 |
| 2023/0177888 | A1* | 6/2023 | Salter .............. G06Q 10/06315 |
| 2023/0202521 | A1* | 6/2023 | Krishnamoorthy ......................... B60W 60/0015 701/24 |
| 2023/0202522 | A1* | 6/2023 | Cui .................. B60W 60/0015 701/24 |

OTHER PUBLICATIONS

Yang et al., "A Hierarchical Behavior Prediction Framework at Signalized Intersections," 2021 IEEE International Intelligent Transportation Systems Conference (ITSC), Oct. 29, 2021, 7 pages (https://doi.org/10.1109/ITSC48978.2021.9564798).

Huang et al., "Driving Behavior Modeling using Naturalistic Human Driving Data with Inverse Reinforcement Learning," IEEE Transactions on Intelligent Transportation Systems (Early Access), pp. 1-13, Jul. 20, 2021 (https://doi.org/10.1109/TITS.2021.3088935).

Rosbach et al., "Driving with Style: Inverse Reinforcement Learning in General-Purpose Planning for Automated Driving," 2019 IEEE/RSJ International Conference on Intelligent Robots and Systems (IROS), pp. 2658-2665, Sep. 12, 2020 (https://doi.org/10.1109/IROS40897.2019.8968205).

Xing et al., "A Unified Multi-scale and Multi-task Learning Framework for Driver Behaviors Reasoning," Mar. 20, 2020, 15 pages (https://arxiv.org/abs/2003.08026).

Shou et al., "Long-Term Prediction of Lane Change Maneuver Through a Multilayer Perception," 2020 IEEE Intelligent Vehicles Symposium (IV), Jun. 23, 2020, 7 pages (https://doi.org/10.1109/IV47402.2020.9304587).

Jabri et al., "Unsupervised Curricula for Visual Meta-Reinforcement Learning," 33rd Conference on Neural Information Processing Systems (NeurIPS 2019), Dec. 9, 2019, 13 pages (https://proceedings.neurips.cc/paper/2019/hash/d5a28f81834b6df2b6db6d3e5e2635c7-Abstract.html).

Wang et al., "Clustering of Driving Encounter Scenarios Using Connected Vehicle Trajectories," IEEE Transactions on Intelligent Vehicles, 5(3):485-496, Mar. 16, 2019 (https://doi.org/10.1109/TIV.2020.2973550).

Sun et al., "Probabilistic Prediction of Interactive Driving Behavior via Hierarchical Inverse Reinforcement Learning," 2018 21st International Conference on Intelligent Transportation Systems (ITSC), pp. 2111-2117, Sep. 9, 2018 (https://doi.org/10.1109/ITSC.2018.8569453).

Berndt et al., "Continuous Driver Intention Recognition with Hidden Markov Models," 2008 11th International IEEE Conference on Intelligent Transportation Systems, Oct. 2008, pp. 1189-1194 (https://doi.org/10.1109/ITSC.2008.4732630).

Li et al., "Driving Intention Inference based on Dynamic Bayesian Networks," Advances in Intelligent Systems and Computing, 279:1109-1119, Jan. 2014 (http://dx.doi.org/10.1007/978-3-642-54927-4_106).

Kasper et al., "Object-Oriented Bayesian Networks for Detection of Lane Change Maneuvers," IEEE Intelligent Transportation Systems Magazine, 4(3):19-31, Aug. 2012 (https://doi.org/10.1109/MITS.2012.2203229).

Woo et al., "Dynamic Potential-Model-Based Feature for Lane Change Prediction," 2016 IEEE International Conference on Systems, Man, and Cybernetics (SMC), Oct. 2016, pp. 838-843 (https://doi.org/10.1109/SMC.2016.7844344).

Jain et al., "Brain4cars: Car that Knows before you do via Sensory-Fusion Deep Learning Architecture," arXiv preprint arXiv:1601.00740, Jan. 5, 2016, 15 pages (https://doi.org/10.48550/arXiv.1601.00740).

Mahajan et al., "Prediction of Lanechanging Maneuvers with Automatic Labeling and Deep Learning," Transportation Research Record, 2674(7):336-347, Jun. 12, 2020 (https://journals.sagepub.com/doi/10.1177/0361198120922210).

Ziebart et al., "Maximum Entropy Inverse Reinforcement Learning," 23rd AAAI Conference on Artificial Intelligence, Jul. 2008, pp. 1433-1438 (https://www.aaai.org/Papers/AAAI/2008/AAAI08-227.pdf).

Hu et al., "Generic Prediction Architecture Considering both Rational and Irrational Driving Behaviors," 2019 IEEE Intelligent Transportation Systems Conference (ITSC), Jul. 23, 2019, pp. 3539-3546 (https://doi.org/10.48550/arXiv.1907.10170).

Naumann et al., "Analyzing the Suitability of Cost Functions for Explaining and Imitating Human Driving Behavior Based on Inverse Reinforcement Learning," 2020 IEEE International Conference on Robotics and Automation (ICRA), May 2020, pp. 5481-5487 (https://doi.org/10.1109/ICRA40945.2020.9196795).

Xing et al., "Driver Lane Change Intention Inference for Intelligent Vehicles: Framework, Survey, and Challenges," IEEE Transactions on Vehicular Technology 68(5):4377-4390, Mar. 6, 2019 (https://doi.org/10.1109/TVT.2019.2903299).

Schmidt et al., "A Mathematical Model for Predicting Lane Changes Using the Steering Wheel Angle," Journal of Safety Research, 49(2014):85-90, Apr. 24, 2014 (https://doi.org/10.1016/j.jsr.2014.02.014).

\* cited by examiner

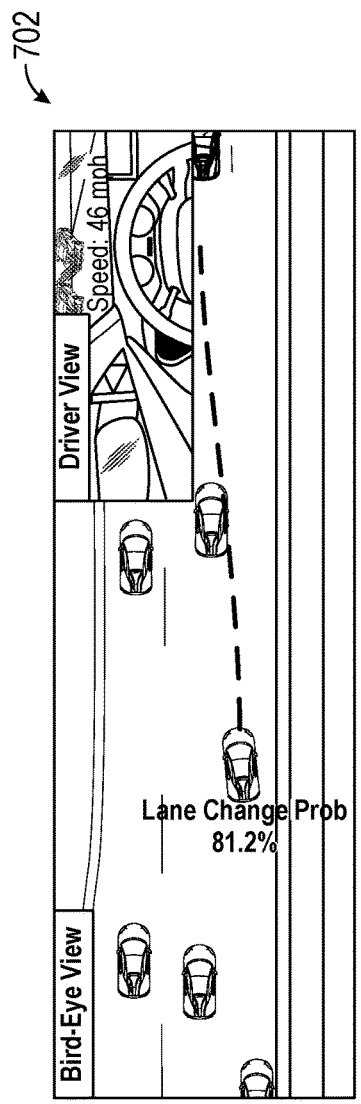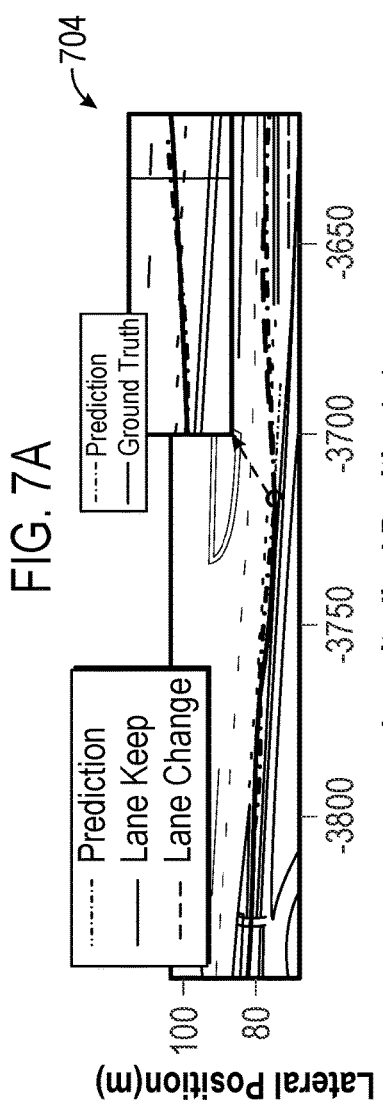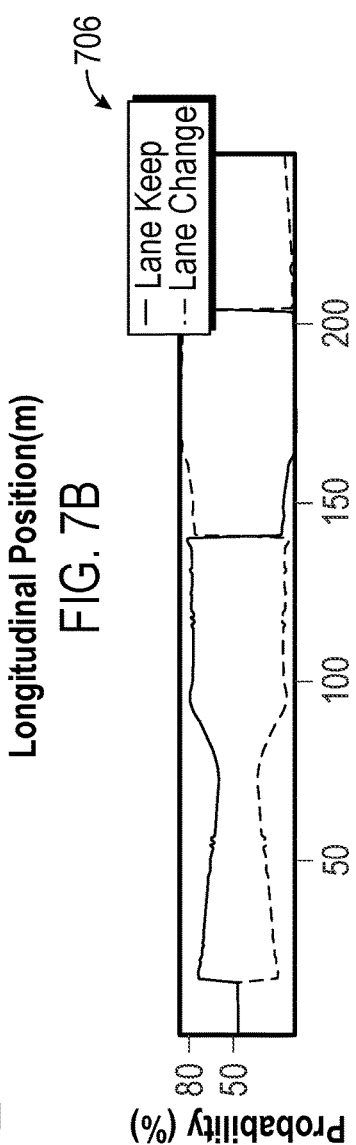
FIG. 7A
FIG. 7B
FIG. 7C

PERSONALIZED VEHICLE LANE CHANGE MANEUVER PREDICTION

TECHNICAL FIELD

The disclosed technology relates generally to predicting vehicle lane change maneuvers of drivers, and more particularly, in some embodiments, to personalized vehicle lane change maneuver prediction.

DESCRIPTION OF RELATED ART

Autonomous vehicles are no longer confined to the world of science fiction. Vehicles capable of achieving Level 2 automation (within the framework defined by the Society of Automotive Engineers (SAE) International and adopted by the National Highway Traffic Safety Administration (NHTSA)) are already traversing the roadways, and vehicles capable of achieving Level 3 automation will likely join them in the near future. Moreover, with connected and automated vehicle (CAV) technologies expected to remain an area of intense industry research focus in the coming years, vehicles capable of achieving even higher levels of automation are no longer a distant reality.

As CAV technology advances, the percentage of CAVs on the roadways is expected to grow as well. However, given the current state of the transportation infrastructure, CAVs are not expected to completely supplant human-driven vehicles in the foreseeable future. That is, CAVs and human-driven vehicles will likely share the road networks for many years to come. In such a mixed-traffic environment, in order to ensure safe and efficient interactions with human-driven vehicles, CAVs will need to be able to accurately determine and predict the maneuvers of surrounding vehicles, a task made more difficult by the wide range of human driver uncertainties.

BRIEF SUMMARY OF THE DISCLOSURE

Systems, methods, computer-readable media, techniques, and algorithms for performing personalized vehicle lane change prediction are disclosed. In particular, according to example embodiments of the disclosed technology, a learning-based lane change prediction algorithm that evaluates the driving behaviors of a target human driver and predicts lane change maneuvers based on those driving behaviors, as well as, systems, methods, and computer-readable media storing executable instructions configured to implement such an algorithm are disclosed. The algorithm may have a hierarchical structure that seamlessly fuses an online lane change decision prediction phase with a trajectories prediction phase that considers driver preferences and vehicular interactions. In some embodiments, a driver's lane change preference (e.g., cost function) is recovered based on inverse reinforcement learning (IRL) for trajectory prediction.

During the offline learning phase, in some embodiments, a Long-Short Term Memory (LSTM) network may be trained based on historical vehicle states. Then, during the online validation phase, driving data may be collected and fed to the trained LSTM network to predict a driver's lane change maneuver, identify potential vehicle trajectories, and determine a most probable vehicle trajectory based on a driver's cost function recovered during the offline phase. In addition, during the online phase, actual driver lane change behavior data may be collected and fed back to the offline phase to refine the lane change prediction training.

In an example embodiment, a vehicle control system includes a personalized lane change prediction control circuit, which in turn, includes at least one memory storing machine-executable instructions and at least one processor configured to access the at least one memory and execute the machine-executable instructions to perform a set of operations. The set of operations may include (the numbering does not does not necessarily an order in which the operations are performed): 1) obtaining historical driving data for a driver of a target vehicle, 2) generating training data from the historical driving data, 3) training a machine learning model based on the training data to perform lane change prediction, recovering one or more personalized cost functions for the driver, 4) predicting, using the trained machine learning model, a lane change-related maneuver of the target vehicle based on real-time vehicle state information associated with the target vehicle, and 5) determining, based on a selected cost function of the one or more personalized cost functions, a most probable trajectory for the target vehicle from a set of candidate trajectories.

In an example embodiment, the lane change-related maneuver is a lane change maneuver of the target vehicle from a current lane to an adjacent lane or a lane keep maneuver according to which the target vehicle remains in the current lane.

In an example embodiment, the at least one processor is configured to generate the training data from the historical driving data by executing the machine-executable instructions to perform operations including applying a clustering algorithm to the historical driving data to obtain the training data, where the training data includes labeled time series data, and where each time step of the labeled time series data comprises a first label indicative of the lane change maneuver or a second label indicative of the lane keep maneuver.

In an example embodiment, the at least one processor is further configured to generate the training data from the historical driving data by executing the machine-executable instructions to perform further operations including applying one or more morphological operations to the labeled time series data to temporally relate adjacent labeled time steps.

In an example embodiment, the one or more personalized cost functions for the driver include a first cost function corresponding to the lane change maneuver and a second cost function corresponding to the lane keep maneuver.

In an example embodiment, the at least one processor is configured to recover the first cost function and the second cost function by executing the machine-executable instructions to perform operations including identifying, from among a set of candidate features, a first set of features that is most predictive of the lane change maneuver, identifying, from among the set of candidate features, a second set of features that is most predictive of the lane keep maneuver, determining a first set of feature weights to apply to the first set of features, and determining a second set of feature weights to apply to the second set of features.

In an example embodiment, the first set of features and the second set of features include different combinations of features.

In an example embodiment, the at least one processor is further configured to execute the machine-executable instructions to perform additional operations including selecting one of the first cost function or the second cost function based on the predicted lane change-related maneuver of the target vehicle, determining a respective probability of each candidate trajectory based on the selected cost function, and selecting the candidate trajectory with the highest respective probability as the most probable trajectory.

In an example embodiment, the at least one processor of the personalized lane change prediction control circuit is further configured to execute the machine-executable instructions to perform additional operations including determining a lane change probability for the target vehicle.

In an example embodiment, the at least one processor is further configured to execute the machine-executable instructions to perform additional operations including generating additional training data from the real-time vehicle state information and re-training the machine learning model using the additional training data to refine the predictive capacity of the machine learning model.

In an example embodiment, a method for personalized lane change prediction includes (the numbering does not necessarily imply the order in which the operations are performed): 1) training a machine learning model based on training data to perform lane change prediction, the training data being indicative of historical lane change behavior of a driver of a target vehicle, 2) predicting, using the trained machine learning model, a lane change-related maneuver of the target vehicle based on real-time vehicle state information associated with the target vehicle, and 3) determining, based on a selected personalized cost function for the driver and the predicted lane change-related maneuver, a most probable trajectory for the target vehicle from a set of candidate trajectories.

In an example embodiment, the lane change-related maneuver is a lane change maneuver of the target vehicle from a current lane to an adjacent lane or a lane keep maneuver according to which the target vehicle remains in the current lane.

In an example embodiment, the method for personalized lane change prediction further includes receiving historical driving data for the driver, the historical driving data being indicative of the historical lane change behavior of the driver and applying a clustering algorithm to the historical driving data to obtain the training data, wherein the training data includes labeled time series data, and wherein each time step of the labeled time series data comprises a first label indicative of the lane change maneuver or a second label indicative of the lane keep maneuver.

In an example embodiment, the method for personalized lane change prediction further includes applying one or more morphological operations to the labeled time series data to temporally relate adjacent labeled time steps.

In an example embodiment, the method for personalized lane change prediction further includes recovering one or more personalized cost functions for the driver, where the recovering includes recovering a first cost function corresponding to the lane change maneuver and a second cost function corresponding to the lane keep maneuver.

In an example embodiment, recovering the first cost function and the second cost function includes identifying, from among a set of candidate features, a first set of features that is most predictive of the lane change maneuver, identifying, from among the set of candidate features, a second set of features that is most predictive of the lane keep maneuver, determining a first set of feature weights to apply to the first set of features, and determining a second set of feature weights to apply to the second set of features.

In an example embodiment, the first set of features and the second set of features include different combinations of features.

In an example embodiment, selecting one of the first cost function or the second cost function based on the predicted lane change-related maneuver of the target vehicle, determining a respective probability of each candidate trajectory based on the selected cost function, and selecting the candidate trajectory with the highest respective probability as the most probable trajectory.

In an example embodiment, the method for personalized lane change prediction further includes determining a lane change probability for the target vehicle.

In an example embodiment, a non-transitory computer-readable medium is disclosed that stores machine-executable instructions that, responsive to execution by at least one processor, cause operations to be performed including (the numbering does not necessarily imply the order in which the operations are performed): 1) training a machine learning model based on training data to perform lane change prediction, the training data being indicative of historical lane change behavior of a driver of a target vehicle, 2) predicting, using the trained machine learning model, a lane change-related maneuver of the target vehicle based on real-time vehicle state information associated with the target vehicle, and 3) determining, based on a personalized cost function for the driver and the predicted lane change-related maneuver, a most probable trajectory for the target vehicle from a set of candidate trajectories.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 7A illustrates a lane change prediction visualization within a human-in-the-loop co-simulation driving platform in accordance with example embodiments of the disclosed technology.

FIG. 7B illustrates an overall lane change prediction process in accordance with example embodiments of the disclosed technology.

FIG. 7C illustrates predicted lane change probability over time in accordance with example embodiments of the disclosed technology.

Figure 1:
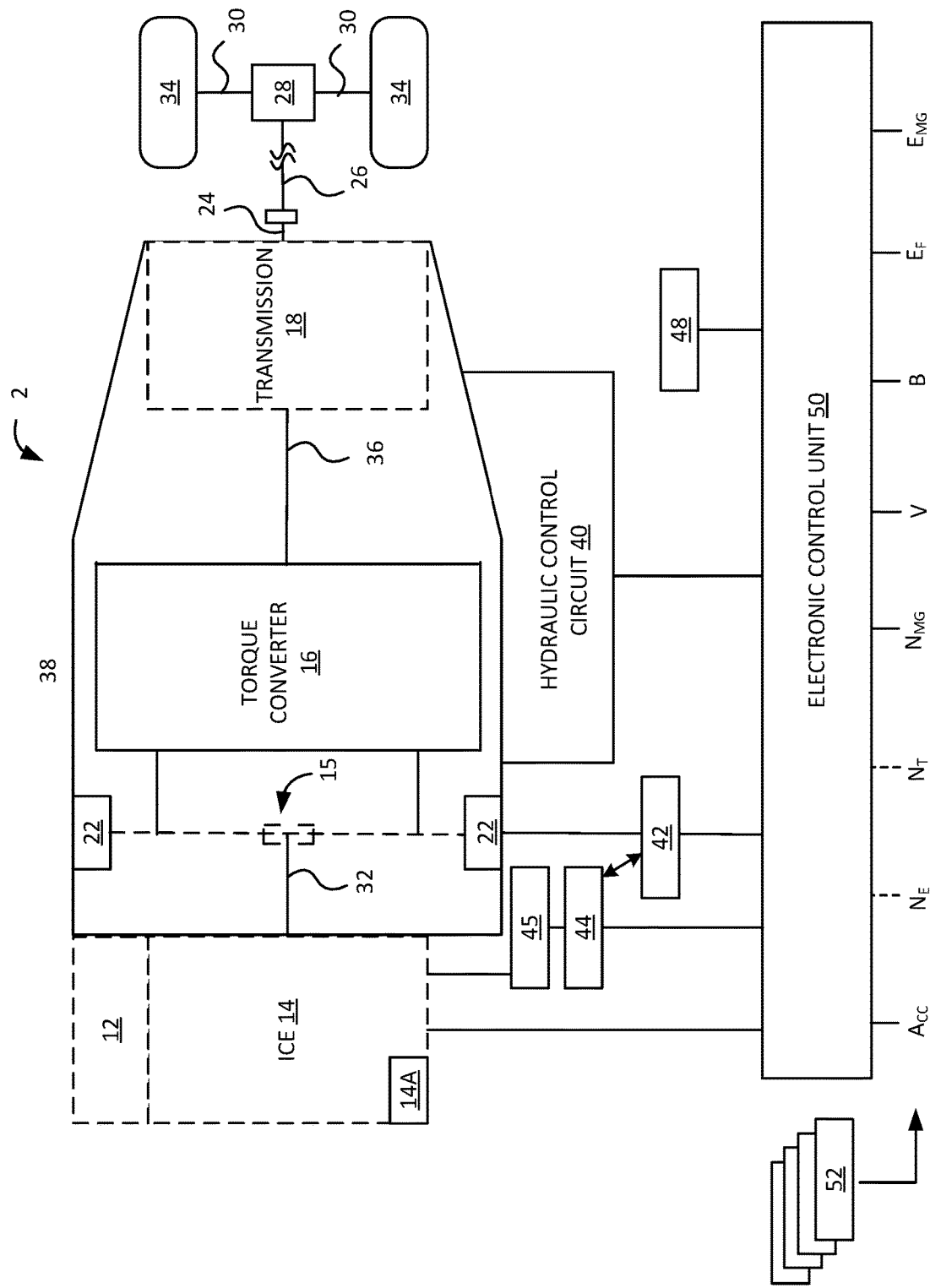
FIG. 1 is a schematic representation of an example hybrid vehicle in which embodiments of the disclosed technology can be implemented.

The figures are not exhaustive and do not limit the present disclosure to the precise form disclosed.

DETAILED DESCRIPTION

Connected and automated vehicles (CAVs) can be driven under partial or full automation with the help of their onboard perception sensors. CAVs can also cooperate with other transportation entities through, for example, vehicle-to-everything (V2X) communication. CAVs have the potential to address some of the most pressing safety, mobility, and environmental sustainability concerns surrounding the current state of our transportation systems. However, despite the promise that CAV technology holds, and despite—or perhaps even due to—the rapid pace of innovation in the CAV space, our transportation systems likely will continue to be the bottlenecks to achieving full automation/connectivity in the near future. Accordingly, CAVs and human-driven vehicles are expected to simultaneously occupy the roadways for many years.

In a mixed traffic environment that includes both CAVs and human-driven vehicles, a CAV actively perceives the surrounding traffic, predicts the behaviors of human-driven vehicles, makes decisions regarding the actions to be taken, and executes such actions through a planner and controller. Predicting human-driven vehicle behavior, however, is a challenging endeavor due to the inherent uncertainties associated with human driver behaviors.

Among the most challenging of human driver behaviors to predict is a lane change. Because a lane change maneuver requires the tacit cooperation of lateral control and longitudinal control from the driver, predicting a lane change can be a more complex task than, for example, predicting a longitudinal maneuver such as car-following, which is heavily correlated with the gap between the ego vehicle (following vehicle) and the leading vehicle (followed vehicle). However, because a lane change maneuver is a fundamental type of driving maneuver that is frequently performed by human drivers, CAVs should be able to accurately predict the lane change behavior of human drivers in order to provide inputs to the downstream motion planners and controllers, and thereby enable better cooperation with surrounding human-driven vehicles.

Embodiments of the disclosed technology relate to systems, methods, computer-readable media, techniques, and algorithms for performing personalized vehicle lane change prediction. In particular, according to various embodiments, a learning-based lane change prediction algorithm that evaluates the driving behaviors of a target human driver and predicts lane change maneuvers based on those driving behaviors, as well as, systems, methods, and computer-readable media storing executable instructions configured to implement such an algorithm are disclosed. The algorithm may be able to predict the varying lane change behavior of different human drivers based on their personal historical driving behavior.

The algorithm may have a hierarchical structure that seamlessly fuses an online lane change decision prediction phase with a trajectories prediction phase that considers driver preferences and vehicular interactions. In some embodiments, the driver's lane change preference (e.g., cost function) may be recovered during the offline phase using inverse reinforcement learning (IRL) for trajectory prediction. More particularly, in some embodiments, during the offline learning phase, a machine learning model such as a Long-Short Term Memory (LSTM) network may be trained to predict lane change decisions based on historical vehicle states. Then, during the online phase, validation may be carried out on a custom-built human-in-the-loop co-simulation platform, including collecting driving data, feeding the driving data to the trained machine learning model to predict a lane change maneuver, identifying potential vehicle trajectories, and determining a most probable trajectory based on a corresponding cost function recovered for the driver during the offline phase. Moreover, actual personalized lane change behavior data may be collected and fed to the offline phase to refine the lane change prediction training.

A learning-based lane change prediction algorithm according to example embodiments of the disclosed technology yields a number of technical improvements over existing lane change prediction techniques. One such technical improvement is the algorithm's capability to personalize the lane change prediction for individual vehicles/drivers. In particular, in example embodiments, historical driving data specific to a driver is identified and a machine learning model (e.g., a neural network) is trained to learn the driver's personalized driving behavior, including the driver's personalized lane change behavior. As such, the learning-based lane change prediction algorithm disclosed herein yields both a more accurate and a more refined level of lane change prediction than conventional techniques.

Another technical improvement provided by a learning-based lane change prediction algorithm according to example embodiments of the disclosed technology is the longer prediction horizon that is achieved by applying a greater weight to longitudinal vehicle inputs (e.g., longitudinal vehicle acceleration) than lateral inputs (e.g., lateral vehicle acceleration). More specifically, in some embodiments, a learning-based lane change prediction algorithm according to example embodiments of the disclosed technology is able to predict lane change behavior earlier than conventional prediction techniques by weighting longitudinal vehicle inputs more heavily than lateral vehicle inputs, and thus, employing a longer prediction horizon.

Still another technical improvement of a learning-based lane change prediction algorithm according to example embodiments of the disclosed technology is the capability to personalize feature selection for the cost function of a driver. In particular, the algorithm is able to account for different set of features being more predictive of the lane change behavior of different drivers. For instance, driver A may be a more anxious driver than Driver B, in which case, a lane change urgency feature for driver A may indicate an increased urgency to change lanes for a given remaining lane change area than for driver B.

Yet another technical improvement of a learning-based lane change prediction algorithm according to example embodiments of the disclosed technology is the efficient generation of training data to train a machine learning model (e.g., a neural network such as an LSTM network) to perform lane change prediction. In particular, the algorithm may generate the training data using an unsupervised data labeling method that relies on temporal information to relate adjacent data points in a time series. Generating training data using such an unsupervised data labeling method is substantially less cumbersome than a supervised labeling method. It should be appreciated that the above-described technical improvements provided by embodiments of the disclosed technology are merely illustrative and not exhaustive.

Embodiments of the disclosed technology may be implemented in connection with any of a number of different vehicles including, without limitation, automobiles, trucks, motorcycles, recreational vehicles, or other similar on- or off-road vehicles, and in connection with any of a number of different vehicle types including, without limitation, gasoline-powered vehicles, diesel-powered vehicles, fuel-cell vehicles, electric vehicles, hybrid electric vehicles, or other vehicle types. An example hybrid electric vehicle (HEV) in which embodiments of the disclosed technology may be implemented is illustrated in FIG. 1.

FIG. 1 illustrates a drive system of an example vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source. For example, a first travel mode may be an engine-only travel mode that only uses internal combustion engine 14 as the source of motive power. A second travel mode may be an electric-only travel mode that only uses the motor(s) 22 as the source of motive power. A third travel mode may be an HEV travel mode that uses both the engine 14 and the motor(s) 22 as the sources of motive power. In the engine-only and HEV travel modes, vehicle 2 relies on the motive force generated at least by internal combustion engine 14, and a clutch 15 may be included to engage engine 14. In the electric-only travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine 14. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operates as a generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc-type hydraulic frictional engagement device whose engagement is controlled by an actuator such as a hydraulic actuator. Clutch 15 may be controlled such that its engagement state is complete engagement, slip engagement, or complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As noted above, vehicle 2 may include an electronic control unit 50. Electronic control unit 50 may include circuitry to control various aspects of the vehicle operation. Electronic control unit 50 may include, for example, a microcomputer that includes one or more processing units (e.g., microprocessors), memory storage (e.g., RAM, ROM, etc.), and I/O devices. The processing units of electronic control unit 50 execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, NE, of internal combustion engine 14 (engine RPM), a rotational speed, $N_{MG}$, of the motor 22 (motor rotational speed), and vehicle speed, $N_V$. These may also include torque converter 16 output, NT (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, LiDAR or other vehicle proximity sensors, and cameras or other image sensors. Such sensors can be used to detect, for example, other vehicles on a roadway; traffic signs (e.g., speed limit signs); lane markings; road curvature; obstacles in the road; and so on. Still other sensors may include inclination sensors that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustrative purposes only as an example of a vehicle system in connection with which embodiments of the disclosed technology may be implemented. One of ordinary skill in the art reading this description will understand how the disclosed embodiments can be implemented with vehicle platforms.

Figure 2:
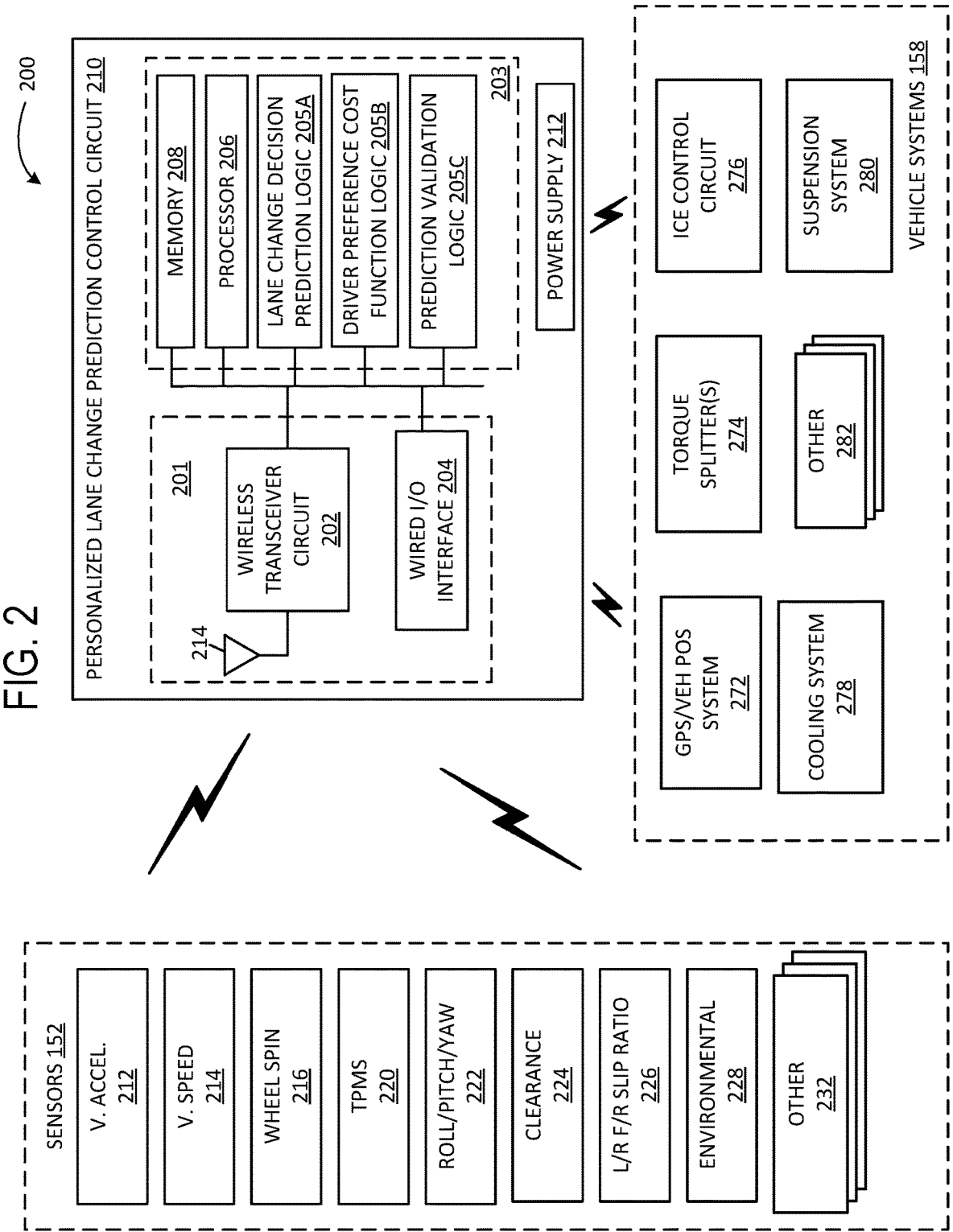
FIG. 2 illustrates an example vehicle system architecture configured to implement personalized vehicle lane change maneuver prediction in accordance with example embodiments of the disclosed technology.

FIG. 2 illustrates an example vehicle system architecture configured to implement personalized vehicle lane change maneuver prediction in accordance with example embodiments of the disclosed technology. In the example of FIG. 2, a personalized lane change prediction system 200 is provided that includes a personalized lane change prediction control circuit 210, a plurality of sensors 152, and a plurality of vehicle systems 158. The personalized lane change prediction circuit 210 is an example architecture for implementing a learning-based lane change prediction algorithm in accordance with example embodiments of the disclosed technology. Sensors 152 and vehicle systems 158 can communicate with the personalized lane change prediction control circuit 210 via a wired or wireless communication interface. Further, the sensors 152 and vehicle systems 158 may also communicate with each other as well as with other vehicle systems. Personalized lane change prediction control circuit 210 can be implemented as or within an electronic control unit such as electronic control unit 50. In other embodiments, personalized lane change prediction control circuit 210 can be implemented independently of ECU 50, for example.

The example personalized lane change prediction control circuit 210 includes a communication circuit 201, a decision circuit 203 (including a processor 206 and memory 208) and a power supply 212. The decision circuit 203 further includes lane change decision prediction logic 205A, driver preference cost function logic 205B, and prediction validation logic 205C. Components of personalized lane change prediction control circuit 210 are illustrated as communicating with each other via a data bus, although other communication interfaces are also contemplated.

Processor 206 can include a graphical processing unit (GPU), a central processing unit (CPU), a microprocessor, or any other suitable processing unit/system/chip. The memory 208 may include one or more various volatile and/or non-volatile forms of memory/data storage (e.g., flash memory, random access memory (RAM), etc.) into which the logic 205A, the logic 205B, and/or the logic 205C can be loaded, along with any data, variables, etc. received as input to the logic 205A, logic 205B, and/or logic 205C in order to be executed by processor 206. In particular, memory 208, can be made up of one or more modules of one or more different types of memory, and may be configured to store data and other information as well as operational instructions that may be used by the processor 206 to enable functionality of the circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors; controllers; application specific integrated circuits (ASICs); programmable logic devices arrays such as programmable logic arrays (PLAs), programmable array logic (PAL), and complex programmable logic devices (CPLDs); field programmable gate arrays (FPGAs); logical components; software routines; and/or other mechanisms might be implemented to make up personalized lane change prediction control circuit 210.

Communication circuit 201 may be either or both of a wireless transceiver circuit 202 with an associated antenna 214 or a wired I/O interface 204 with an associated hardwired data port (not illustrated). As this example illustrates, communications with personalized lane change prediction control circuit 210 can occur via wired and/or wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio frequency (RF) signals wirelessly to wireless equipment with which it is connected and to receive radio signals as well. These RF signals can include information of almost any sort that is sent or received by personalized lane change prediction control circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries); a power connector (e.g., to connect to vehicle supplied power, etc.); an energy harvester (e.g., solar cells, piezoelectric system, etc.); or any other suitable power supply.

Sensors 152 can include, for example, any of the types of sensors described with respect to sensors 52 depicted in the example of FIG. 1. For instance, the sensors 152 may include inertial sensors (e.g., inertial measurements units (IMUS), accelerometers, gyroscopes, etc.) configured to capture acceleration, velocity/speed, and orientation data; temperature sensors; vibration sensors; sensors configured to capture data relating to the operation of electrical (e.g., battery) and/or mechanical (e.g., powertrain) components of the vehicle; and so forth. The sensor data captured by such sensors 152 may include data indicative of vehicle operating parameters such as position/location data; speed/velocity data; acceleration data; braking data; steering data; and so forth. In some embodiments, sensors 152 may include additional sensors that may or not otherwise be included on a standard vehicle in which the personalized lane change prediction system 200 is implemented.

In example embodiments, the sensors 152 may be configured to continuously monitor and capture data relating to an environment, operational parameter, or the like. In some embodiments, a sensor 152 may periodically capture data according to a predetermined schedule (e.g., a sampling rate, a scanning rate of a LiDAR, etc.). In some embodiments, the sensor data may include image data of an environment surrounding a vehicle. The image data of the vehicle's external environment may be captured at a selected frame rate by a collection of cameras. The cameras may be disposed such that different cameras capture image data of different portions of the external environment. In example embodiments, the sensor data reflective of sensed characteristics within a vehicle's external environment may further include three-dimensional (3D) point cloud data captured by a LiDAR, radar data, or the like.

In the illustrated example, sensors 152 include vehicle acceleration sensors 212; vehicle speed sensors 214; wheel-spin sensors 216 (e.g., one for each wheel); a tire pressure monitoring system (TPMS) 220; accelerometers such as a 3-axis accelerometer 222 to detect roll, pitch and yaw of the vehicle; vehicle clearance sensors 224; left-right and front-rear slip ratio sensors 226; and environmental sensors 228 (e.g., to detect salinity or other environmental conditions). Additional sensors 232 can also be included as may be appropriate for a given implementation of the personalized lane change prediction system 200.

Vehicle systems 158 can include any of a number of different vehicle components or subsystems used to control or monitor various aspects of the vehicle and its performance. In this example, the vehicle systems 158 include a Global Positioning System (GPS) or other vehicle positioning system 272; torque splitters 274 that can control distribution of power among the vehicle wheels such as, for example, by controlling front/rear and left/right torque split; engine control circuits 276 to control the operation of a vehicle engine (e.g. internal combustion engine 14); cooling systems 278 to provide cooling for the motors, power electronics, the engine, or other vehicle systems; suspension system 280 such as, for example, an adjustable-height air suspension system; and other vehicle systems.

During operation of the personalized lane change prediction control circuit 210, the processor 206 may execute the lane change decision prediction logic 205A to implement an offline learning phase of a learning-based lane change prediction algorithm. The offline learning phase may include training a machine learning model (e.g., a neural network such as a LSTM network) to perform personalized lane change prediction. In some embodiments, the processor 206 may execute the lane change decision prediction logic 205A to generate training data using an unsupervised labeling method that includes applying a data clustering algorithm, such as density-based spatial clustering of applications with noise (DBSCAN), to historical vehicle trajectory data to label lane change and lane keep maneuvers for each vehicle state at each time step and to ultimately obtain, as output, two clusters of vehicle states, i.e., lane change or lane keep. The processor 206 may further execute the lane change decision prediction logic 205A to incorporate temporal information into the clustered output of the data clustering algorithm to temporally relate adjacent data points and obtain labeled time series data. Further, in some embodiments, the processor 206 may execute the driver preference cost function logic 205B to select various features for a personalized driver cost function and recover the cost function using, for example, an IRL technique.

Moreover, during an online validation phase, the processor 206 may execute the prediction validation logic 205C to utilize the trained lane change prediction model to determine potential trajectories of a target vehicle (e.g., a human-driven vehicle whose lane change behavior is being predicted) based on real-time data indicative of the target vehicle's state and based on the recovered cost function for the driver, and to predict the driver's lane change decision based on an evaluation of the most probable trajectory. The driver's lane change decision may be a "lane keep" decision according to which the driver maintains his current lane, or a "lane change" decision according to which the driver performs a lane change maneuver.

In some embodiments, the prediction algorithm disclosed herein may be configured to predict lane change maneuvers and trajectories of an on-ramp driver in an on/off ramp scenario. For example, the online validation phase may be performed using a human-in-the-loop co-simulation driving platform in which a human driver in an on-ramp vehicle either performs a mandatory lane change before the end of the merging area or keeps his/her current lane and enters the off-ramp.

Communication circuit 201 can be used to transmit and receive information between the personalized lane change prediction control circuit 210 and sensors 152, as well as, between the personalized lane change prediction control circuit 210 and vehicle systems 158. Also, sensors 152 may communicate with vehicle systems 158 directly or indirectly (e.g., via communication circuit 201 or otherwise). In various embodiments, communication circuit 201 can be configured to receive data and other information from sensors 152 that may be used to determine various vehicle operational parameters including, without limitation, longitudinal vehicle velocity/acceleration; lateral vehicle velocity/acceleration; time/distance headway between a target vehicle (also referred to herein as an ego vehicle) and a leading vehicle/potential leading vehicle and/or a following vehicle/potential following vehicle; remaining distance of a merging area; and so forth. These parameters may then be inputted to the trained machine learning model to predict a human driver's lane change behavior. Further, these parameters may be assessed as part of the evaluation of candidate vehicle trajectories to determine a most probable vehicle trajectory.

Additionally, communication circuit 201 can be used to send an activation signal or other activation information to various vehicle systems 158. For example, communication circuit 201 can be used to send signals to, for example, one or more of: torque splitters 274 to control front/rear torque split and left/right torque split; motor controllers 276 to, for example, control motor torque and/or motor speed of the various motors in the system; ICE control circuit 276 to, for example, control power to a vehicle engine (e.g., shut down the engine 14 so all power goes to the rear motors, ensure the engine 14 is running to charge the batteries, but at the same time, allow more power to flow to the motors, etc.); cooling system (e.g., to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152.

It should be appreciated that the logic 205A, the logic 205B, and/or the logic 205C may be partitioned into two or more engines, program modules, or the like (referred to generically at times hereinafter simply as program module or module). A program module may be a standalone module or a sub-module of another module. Moreover, each module may be implemented in software as computer/machine-executable instructions or code; in firmware; in hardware as hardwired logic within a specialized computing circuit such as an ASIC, FPGA, or the like; or as any combination thereof. It should be understood that any description herein of a module or a circuit performing a particular task or set of tasks encompasses the task(s) being performed responsive to execution of machine-executable instructions of the module and/or execution of hardwired logic of the module.

Figure 3:
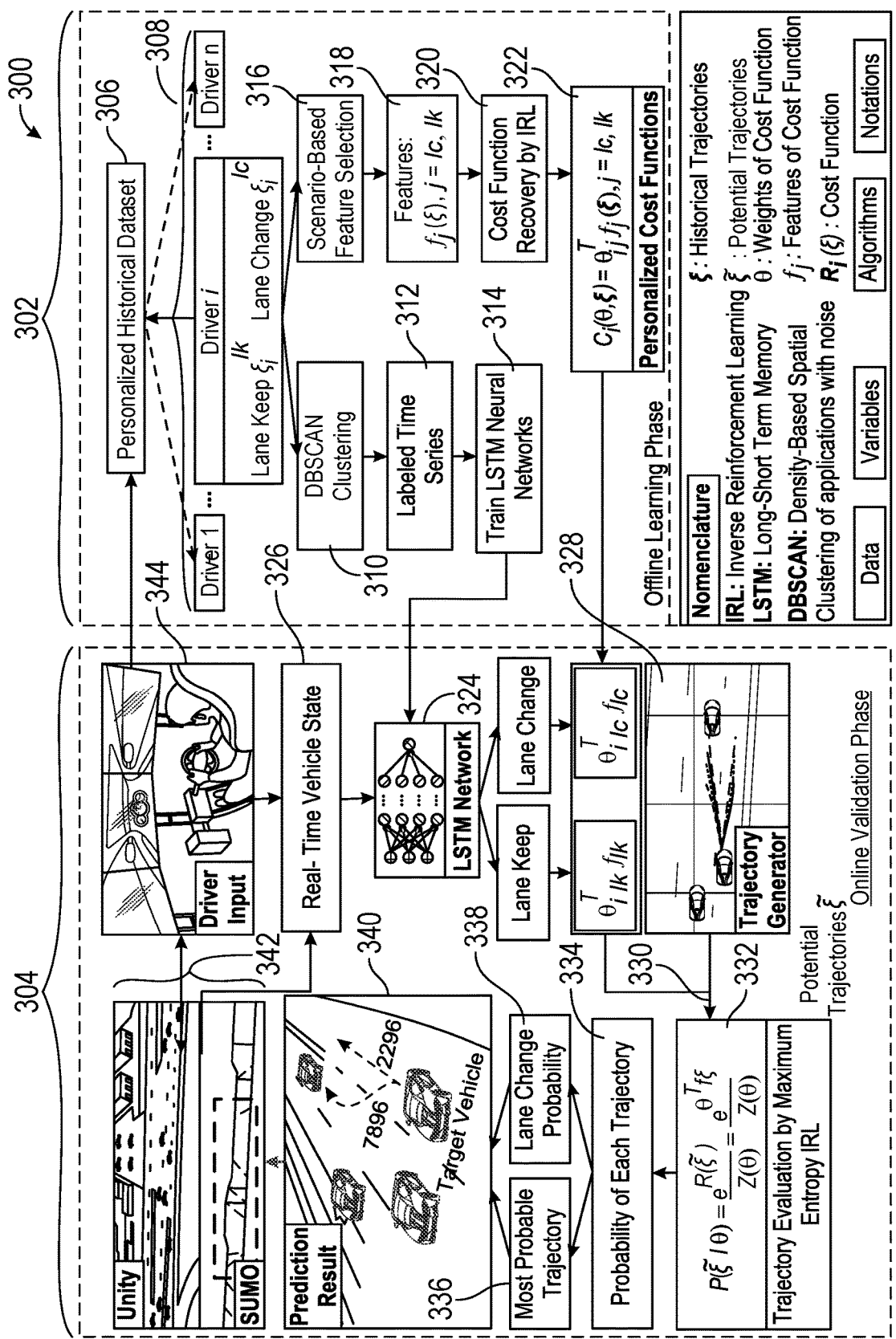
FIG. 3 schematically depicts an example system architecture implementation of a learning-based lane change prediction algorithm in accordance with example embodiments of the disclosed technology.

FIG. 3 schematically depicts an example system architecture implementation 300 of a learning-based lane change prediction algorithm in accordance with example embodiments of the disclosed technology. The system architecture 300 includes a portion 302 that implements an offline learning phase of the algorithm and a portion 304 that implements an online validation phase of the algorithm. During the offline learning phase, a machine learning model (e.g., a LSTM network) may be trained 314 to perform lane change prediction based on a dataset 306 that includes personalized driver behavior data (e.g., personalized driver lane change behavior) for each of a plurality of drivers 308 (individual drivers are at times referred to herein in the singular as driver 308). In some embodiments, the personalized historical driver behavior dataset 306 may be collected based on driver actions taken on a co-simulation platform 342, which may also be where the trained LSTM network 324 is validated during the online validation phase. In some embodiments, the LSTM network may be trained responsive to execution of the lane change decision prediction logic 205A. While an LSTM network is disclosed herein as an example machine learning model that can be trained to perform lane change prediction according to various embodiments, it should be appreciated that other types of neural networks, or other machine learning algorithms more generally, may be employed to perform lane change prediction in accordance with example embodiments of the disclosed technology.

In some embodiments, during the offline learning phase, DBSCAN clustering 310 or a similar clustering algorithm may be utilized to generate labeled time series data 312 as part of an unsupervised data labeling method. In some embodiments, a morphological operation may be performed on the clustered output from the clustering algorithm 310 to temporally relate adjacent data points and generate the labeled time series data 312. In addition, the offline learning phase may infer each driver's 308 lane change preference using IRL, for example, to learn a respective cost function for each driver 308. More specifically, in some embodiments, for a given driver 308, a scenario-based feature selection 316 may be performed to identify which features are salient to that particular driver's lane change behavior, and in turn, determine a feature vector (e.g., a set of feature weights to assign to the features) based on the driver's personalized lane change behavior. An IRL technique 320 may then be employed to recover the driver's personalized cost function 322 based on the driver's personalized feature vector. A similar process may be employed to recover the personalized cost functions for other drivers. In some embodiments, the respective cost functions may be recovered for the drivers 308 responsive to execution of the driver preference cost function logic 205B by the processor 206.

During the online validation phase, the trained LSTM network 324 may analyze vehicle states 326 at each time step to recognize the maneuver being performed as either a lane keep maneuver or a lane change maneuver, and to select, based on the recognized maneuver, an appropriate cost function personalized to the target vehicle being evaluated. A trajectory generator may generate a set of possible/candidate vehicle trajectories of the target vehicle. For instance, the trajectory generator may take the vehicle state 326 as input and generate multiple trajectories within a prediction window. The selected cost function may then be employed to determine respective probabilities of the candidate trajectories of the target vehicle. A most probable trajectory may then be selected as the prediction result.

Referring now to example embodiments of the disclosed technology in more detail, a learning-based algorithm for predicting the lane-change behavior of a target vehicle/driver receives, as ground-truth training data, historical data indicative of the driver's past driving behavior, and in particular, the driver's historical lane change behavior. In some embodiments, a behavior model may be constructed for a driver based on a set of k historical trajectories $\Xi=\{\xi_k\}$, k=1, . . . , K, where each trajectory $\xi_k$ contains a respective vehicle state at each of t time steps, i.e., $\xi_k=[s_1, s_2 \ldots, s_t]$, $s_t$ being a vector representing the vehicle state at the t-th time step. As previously described, the vehicle states may reflect information relating to a target vehicle (i.e., a human-driven vehicle whose lane change behavior is to be predicted) and its surrounding environment, such as information relating to the operation and the perception of the driver of the target vehicle. In some embodiments, a future trajectory of the target vehicle may be denoted as $\hat{\xi}=[s_{t+1}, s_{t+2}, \ldots, s_{t+T}]$, where T is the prediction trajectory horizon. Since the target vehicle's lane-change action and trajectory in the future T steps depend on its past vehicle states, the influence of the historical vehicle states on the future trajectory of the vehicle can be formulated, in some embodiments, as conditional probability density functions: $\rho(A_{t:t+T}|\xi)$, and $\rho(\hat{\xi}|\xi)$ respectively, where $A=\{a_{change}, a_{keep}\}$, that is, the set of possible lane change-related maneuvers including a lane change maneuver in which the target vehicle performs a lane change and a lane keep maneuver in which the target vehicle does not perform a lane change, but rather remains in its current lane.

In some embodiments, the trajectories that contain lane change maneuvers may be determined by monitoring the accumulated lane deviation, and those trajectories may be separated from the larger dataset 306 and further processed to assign a lane change-related decision for the driver at each time step. In some embodiments, a clustering algorithm 310 such as DBSCAN may be used to label each vehicle state with either a lane change label or a lane keep label at each time step. In some embodiments, the clustering algorithm 310 receives the lateral vehicle speed ($v_{lat}$) and the lateral vehicle acceleration ($a_{lat}$) as inputs, and generates two vehicle state clusters as output, i.e., a lane change cluster and a lane keep cluster.

In some embodiments, while DBSCAN may be used to label the training data with either "lane keep" or "lane change" maneuver labels, DBSCAN may not be able to ascertain temporal relationships among data points, and thus, may not be able to guarantee the continuity of the lane-change maneuver. As such, in some embodiments, in order to eliminate noise from the labeled time series data 312, a morphological operation may be applied to the dataset after the DBSCAN clustering 310 is performed. More specifically, a temporal filter algorithm may be employed to de-noise the labeled time series based on temporal characteristics of a lane change maneuver. The temporal filter algorithm may receive, as inputs, the labeled time series data 312 produced by the clustering algorithm 310 as well as a morphological structuring element $M_t$ that accounts for the temporal characteristics of a lane change, and may produce, as output, a continuous de-noised time series dataset. In example embodiments, the morphological structuring element $M_t=[1 \ldots 1]_{1\times 5}$, may be used, assuming, for example, that the lane-change maneuver is continuous in a short period and lasts for at least 0.5 seconds with an update rate of 10 Hz. In other embodiments, different morphological structuring elements may be used that rely on different sets of assumptions.

In an example embodiment, the temporal filtering algorithm may include the following steps: 1) calculate the dilation ($\oplus$) of T by $M_t$: $T_1=T\oplus M_t=\{z\in E|(M_t^s)_z \cap T \neq \emptyset\}$, where E is a Euclidean space or an integer grid, $M_t^s=\{x\in E|-x\in M_t\}$, and $(M_t^s)_z$ is the translation of $M_t^s$ by the vector z, i.e., $(M_t^s)_z=\{b+z|b\in M_t\}, \forall z\in E$; 2) calculate the erosion ($\ominus$) of $T_1$ by $M_t$: $T_2=T_1\ominus M_t=\{z\in E|M_{t_z}\subseteq T_1\}$, where $M_{t_z}$ is the translation by the vector z; 3) calculate the erosion of $T_2$ by $M_t$: $T_3=T_2 \ominus M_t$; and 4) calculate the dilation of $T_3$ by $M_t$: $T_{ult}=T_3 \ominus M_t$. Steps (1) and (2) of the algorithm may be morphological closing operations and steps (3) and (4) of the algorithm may be morphological opening operations.

In example scenarios, a human driver first makes a high-level decision, i.e., perform a lane change or a lane keep (stay in her current lane), and then determines the vehicle trajectory for achieving that high-level objective. Thus, in example embodiments, prior to analyzing the detail of the vehicle trajectory, the driver's intention is first determined. More specifically, example embodiments of the disclosed technology formulate lane-change decision prediction as a time series classification problem, according to which vehicle states in future time steps are classified as either the lane change state or the lane keep state. For example, given historical vehicle states, actions $A_{t:t+T}$ may be classified into $\{a_{keep}, a_{change}\}$ for a future T steps. In some embodiments, each vehicle state in the time series data is highly correlated with its neighbors, a sequence-to-sequence LSTM network—which is a type of recurrent neural network that has proven capable at modeling long-term temporal dependencies among time series—may be adopted to perform multi-step and multi-variable prediction.

Figure 4:
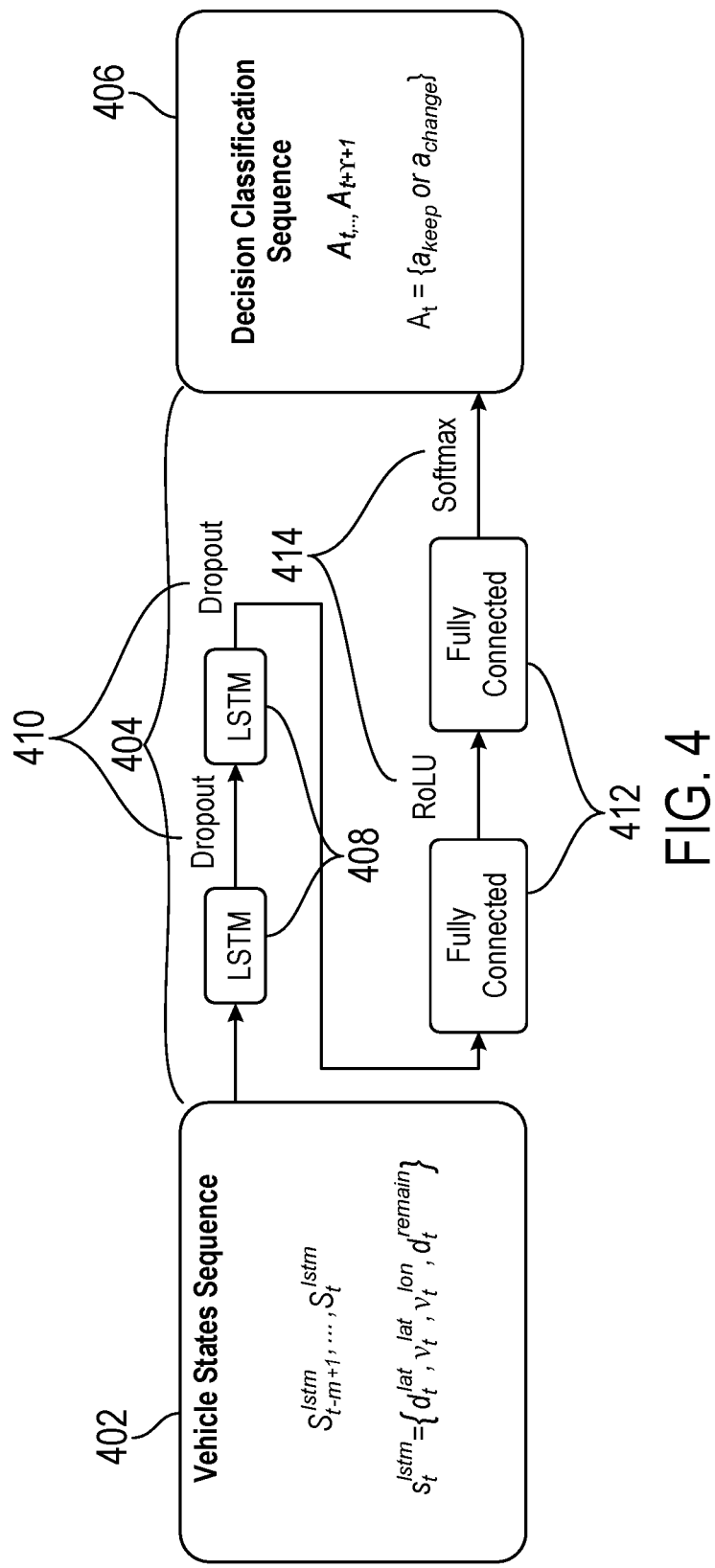
FIG. 4 schematically depicts an example neural network for lane change decision prediction in accordance with example embodiments of the disclosed technology.

FIG. 4 depicts an example LSTM network 404 configurable to perform lane change decision prediction in accordance with example embodiments of the disclosed technology. The LSTM network 404 may be an example implementation of the machine learning model 324. An input 402 to the neural network 404 may be a sequence $\xi=(s_{t-T+1}^{lstm}, \ldots, s_t^{lstm})$ of vehicle states for the last T time steps, where each vehicle state may include the lateral deviation of the vehicle from the centerline of the lane ($d_t^{lat}$), lateral vehicle speed ($v_t^{lat}$), longitudinal vehicle speed ($v_t^{lon}$), and remaining distance for (mandatory) lane change ($d_t^{remain}$, if any). In some embodiments, the input 402 to the neural network 404 may be labeled time series vehicle state data in which each vehicle state at each time step is labeled with either a lane change label or a lane keep label. An output 406 of the LSTM network 404 may be a predicted lane-change action sequence ($A_{t+1}, A_{t+T+1}$) for the next T time steps. In example embodiments, the network 404 may include two LSTM layers 408 (each followed by a corresponding dropout layer 410, for example) and two fully-connected layers 412 (with ReLu and Softmax layers as their activation layers 414, for example). In some embodiments, the labeled dataset may be split into a training dataset, a validation dataset, and a test dataset. In some embodiments, the input dataset 402 may be normalized to the range of [0,1] to account for different vehicle state features being represented using different units.

In example embodiments, the driver behavior model may be described by one or more cost functions for the driver based on the assumption that rational drivers seeks to optimize their cost function. In some embodiments, continuous IRL with locally optimal examples may be employed to recover 320 a driver's unknown cost function. In example embodiments, a cost function may be a linear combination of a set of features, i.e., $C_i(\theta_i, \xi) = \theta_i^T f_i(\xi)$, i=$a_{change}$, $a_{keep}$, where $\theta_i^T$ is the weights vector emphasizing the features, and $f_i(\xi) = \|f_i(s_1, s_2, \ldots, s_t)\|_2$. In some embodiments, IRL may be employed to determine the $\theta_i^*$ of each driver, by maximizing the likelihood of the driver's historical trajectories $\Xi = \{\xi_k\}$, k=1, ..., K, as shown in Equation (1):

$$\theta_i^* = \underset{\theta_i}{\mathrm{argmax}} P(\Xi \mid \theta_i).$$

According to the principle of maximum entropy, as shown in Equation (2) below, a trajectory with a low cost has a higher probability, which is proportional to the exponential of its cost.

$$P(\xi \mid \theta_i) = \frac{e^{-C_i(\theta_i,\xi)}}{Z(\theta)} = \frac{e^{-\theta_i^T f_i(\xi)}}{\int e^{-\theta_i^T f_i(\tilde{\xi})} d\tilde{\xi}}, \text{ where } Z(\theta) = \int e^{-C_i(\theta_i,\tilde{\xi})} d\tilde{\xi} \quad \text{Eq. (2)}$$

is the partition function integrating all arbitrary trajectories $\tilde{\xi}$. In order to handle the computational complexity in solving the partition function $Z(\theta)$, continuous IRL may approximate the cost of an arbitrary trajectory $C_i(\theta_i, \tilde{\xi})$ using the second-order Taylor expansion around the demonstrated trajectory $\xi$, as shown in Equation (3). As a result, the partition function is now a Gaussian integral and becomes analytically solvable.

$$C_i(\theta_i, \tilde{\xi}) \approx C_i(\theta_i, \xi) + (\tilde{\xi} - \xi)^T \frac{\partial C}{\partial \xi} + (\tilde{\xi} - \xi)^T \frac{\partial^2 C}{\partial \xi^2} (\tilde{\xi} - \xi) \quad \text{Eq. (3)}$$

Then combining this approximation with equations (1) and (2), the problem can be reformed as minimizing the log-likelihood of $-\log P(\Xi \mid \theta_i)$, as shown in Equation (4).

$$\theta_i^* = \underset{\theta_i}{\mathrm{argmin}} \sum_{k=1}^{K} \frac{1}{2} g_{\theta_i}^T(\xi_k) H_{\theta_i}^{-1}(\xi_k) g_{\theta_i}(\xi_k) - \frac{1}{2} \log |H_{\theta_i}(\xi_k)|, \quad \text{Eq (4)}$$

where $g^T$ and H are the gradient and hessian, respectively. This formula indicates, for example, that along the expert demonstration, the recovery cost function may have small gradients and large positive Hessians.

As previously described, the offline learning phase 302 of the learning-based lane change prediction algorithm implementation 300 includes a feature selection process 316 to determine a set of features, or more specifically, a set of weights to apply to a set of features to describe the personalized vehicle driving (e.g., lane change) behavior of a driver. In some embodiments, the following illustrative set of features may be used to calculate a driver's cost function, and in some embodiments, recovering a driver's cost function may include determining a personalized set of weights to apply to the following features.

One example type of feature that may be used is "car-following risk." The car-following risk may be the time headway between the target vehicle and a leading vehicle ahead of the target vehicle. The car-following risk may be represented by the following equation: $f_{risk_f} = 1 - \tanh(h_{ev}/H_{min})$, $h_{ev} = d_{headway}/v_{lon}$ Eq. (5), where $H_{min}$ is the minimum safe time headway based on the 3-second rule, $h_{ev}$ is the time headway of the target vehicle to the leading vehicle, and $d_{headway}$ is the distance between the target vehicle and the leading vehicle.

Another example type of feature that may be used is "lane change risk." The lane change risk may be the projected time headway between the target vehicle and a potential leading vehicle to the target vehicle after the target vehicle is projected to its adjacent lane (e.g., projected from a merging lane to a main roadway lane). The lane change risk may be given by the following equation:

$$f_{risk_{lc}} = \frac{1 - \tanh(h'_{ev}/H_{min}) + 1 - \tanh(h'_{fv}/H_{min})}{2}, \quad \text{Eq. (6)}$$

where $H_{min}$ is the minimum safe time headway based on the 3-second rule, $h'_{ev}$ is the projected time headway of the target vehicle to the potential leading vehicle, and $h'_{fv}$ is the projected time headway of the target vehicle from a potential following vehicle.

Another example type of feature that may be used is "lane change urgency." In particular, in those example scenarios in which a target vehicle needs to perform a mandatory lane change, the remaining distance for performing the lane change (i.e., remaining lane change area) should be evaluated. The lane change urgency may be given by the following equation:

$$f_{urge} = \frac{\left[1 + \tanh\left(\frac{L_{width}}{2} - y\right)\right]\left[1 + \tanh\left(\frac{(X_m - x)}{(v_{lon}H_{min})}\right)\right]}{\max(f_{urge})}, \quad \text{Eq. (7)}$$

where the $L_{width}$ is the width of the lane, $x_m$ is the longitudinal location of the midpoint of the merging area, x and y are the locations of the target vehicle, $v_{lon}$ is the longitudinal velocity of the target vehicle, and max ($f_{urge}$) is the maximum value of $f_{urge}$, which may be used to normalize the feature.

Figure 5:
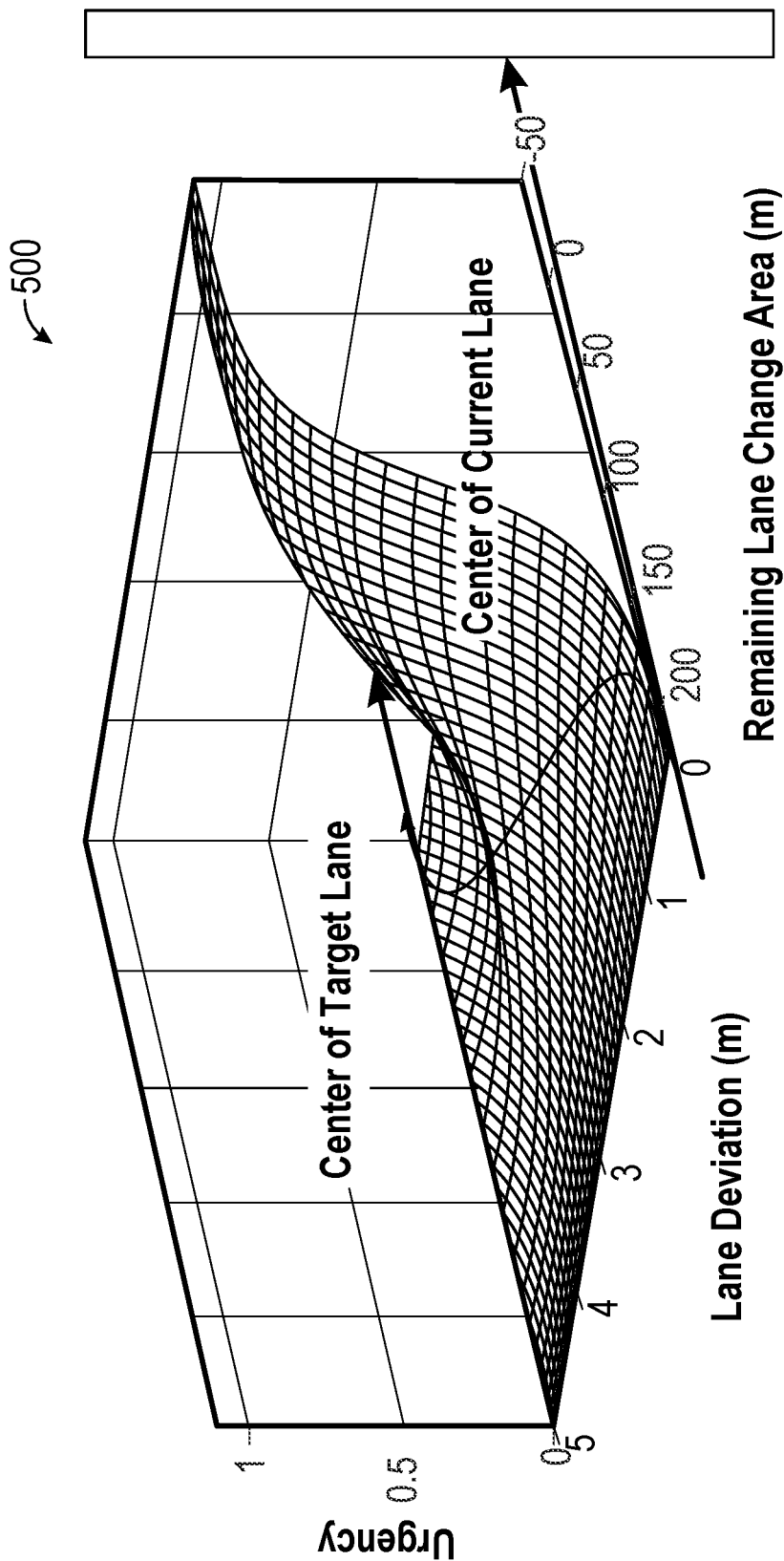
FIG. 5 is a plot that illustrates a relationship between urgency of a lane change maneuver and remaining lane change area in accordance with example embodiments of the disclosed technology.

An example three-dimensional surface representation 500 of the lane change urgency feature as a function of a target vehicle's deviation from a center line of a current lane and the remaining lane change area is shown in FIG. 5. While the representation 500 shows how the lane change urgency feature varies for a 200 m lane change area and a lane width of 4 m, it should be appreciated that these parameters are merely illustrative and can be adjusted to reflect actual real-world values. As shown in FIG. 5, as the target vehicle comes closer to the end of the lane change area without having yet changed the lane, the urgency increases. Further, as the remaining lane change area decreases, the increase in lane change urgency is greater for a smaller deviation from the center line of the current lane. This is because the less the deviation from the center line of the current lane, the greater the lateral distance the target vehicle will have to traverse to accomplish the lane change maneuver for a given remaining lane chance distance. In addition, as shown in FIG. 5, once the lane change is completed, the lane change urgency decreases to zero shortly thereafter.

Yet another example type of feature that may be used to recover a driver's cost function is a "mobility" feature, which may be a measure of the extent to which the target vehicle's current speed deviates from the speed limit. In particular, different drivers may have different preferences regarding mobility, and the difference between the target vehicle's current longitudinal speed ($v_{lon}$) and the speed limit ($v_{lim}$) may be used to evaluate this preference, based on the following equation: $f_m = 1 - e^{-(v_{lim} - v_{lon})^2}$ Eq. (8). As an example, if a driver is driving significantly slower than the speed limit, the remaining lane change distance may decrease more slowly for such a driver, in which case, the driver may have more time to complete the lane change maneuver. This, in turn, may impact the timing of the lane change prediction as well as the trajectory of the target vehicle evaluated as being the most probable trajectory.

Other example types of feature that may be used are a "comfort" feature and a "lane deviation" feature. In example embodiments, the absolute value of the longitudinal acceleration ($a_{lon}$) and the lateral acceleration ($a_{lat}$) may be used to gauge a driver's "comfort" preference, as shown in the following equation: $f_{c1} = |a_{lon}|$, $f_{c2} = |a_{lat}|$ Eq. (9). Further, in example embodiments, the lateral distance of the target vehicle may be incorporated into the cost function via the lane deviation feature to account for lateral deviation from the center line of a current lane even in lane keep vehicle states. The lane deviation $f_d$ may be given by the following equation: $f_d = |y - Y_c|$ Eq. (10), where $Y_c$ is the location of the centerline of the lane, and y is the lateral location.

In some embodiments, another example feature that may be used is a "jerk" feature, which may be a measure of the extent of non-uniformity in the target vehicle's speed over time. In some embodiments, a driver's jerk metric may be based on changes in the target vehicle's longitudinal acceleration ($a_{lon}$), and may be a weighted combination of a measure indicative of the frequency of the changes in $a_{lon}$ and a measure of the accumulated, average, etc. amount of change in $a_{lon}$. It should be appreciated that the absolute value of negative accelerations (i.e., decelerations) may be used when calculating a driver's jerk metric.

A driver may focus on different things when operating a vehicle in a lane change scenario versus a lane keep scenario. These differences in areas of driver focus between the two scenarios may manifest themselves in the form of various features being more relevant to one scenario as opposed to the other. For instance, the lane change risk and the remaining distance may be more relevant to the driver's decision-making when executing (or intending to execute) a lane change maneuver as compared to when keeping the lane. As such, in some embodiments, during the feature selection process 316 shown in FIG. 3, one set of features, e.g., $\{f_{risk_f}, f_{risk_k}, f_{urge}, f_m, f_{c1}\}'$ may be selected and evaluated for lane change maneuvers, and another different combination of features, e.g., $\{f_{risk_f}, f_m, f_{c1}, f_{c2}, f_d\}$ may be selected and evaluated for lane keep maneuvers.

In order to execute a lane change or a lane keep decision, a human driver may plan a trajectory for accomplishing the desired maneuver. Given that real-time performance is desirable for the lane change prediction decision-making disclosed herein, rather than explore arbitrary trajectories, in some embodiments, the trajectory generator 328 may be a polynomial trajectory generator configured to plan the candidate trajectories $\xi_k$ by receiving vehicle state information, e.g., {x, y, v, a}, as input, and generating multiple candidate trajectories 330 within a prediction window (e.g., 4 seconds). The prediction window may be configurable.

Upon generating the candidate trajectories 330, the personalized recovered cost function 322 (e.g., $C_i(\theta_i, \xi) = \theta_i^T f_i(\xi)$) for the driver (the ith driver) may be used to evaluate 332 the probability of each candidate trajectory G. This evaluation may be performed using maximum entropy IRL, and may be represented by the following equation:

$$P(\xi_k \mid \theta_i^*) = \frac{e^{-C_i(\theta_i^*, \xi_k)}}{\sum_{k=1}^{K} e^{-C_i(\theta_i^*, \xi_k)}}. \quad \text{Eq. (11)}$$

Then, the probability estimation 338 for the lane change decision prediction ($\hat{a}_t = \hat{a}_{keep}, \hat{a}_{change}$) may be determined based on the probabilities assigned to individual trajectories. In particular, in some embodiments, the probability of a lane change equals the sum of the probabilities of all sampled lane change trajectories, as given by the following equation:

$$P(\hat{a}_{change}) = \sum_{k=1}^{K} P(\xi_k \mid \theta_i^*). \quad \text{Eq. 12}$$

Referring again to FIG. 3, the lane change prediction capabilities of the trained machine learning lane change decision prediction model 324 (e.g., a trained LSTM network) may be validated during an online validation phase. In some embodiments, the validation may be conducted using a human-in-the-loop co-simulation driving platform 342. In some embodiments, a real-world traffic network may be programmed into the co-simulation platform 342. Traffic flow may be simulated on the platform 342 and human driver input may be simulated on the platform 342 via a set of physical controls. The co-simulation platform 342 enables allows various drivers to conduct human-in-the-loop simulations in an immersive traffic environment, where the driver data is collected, and the algorithm online validation is performed.

Figure 6A:
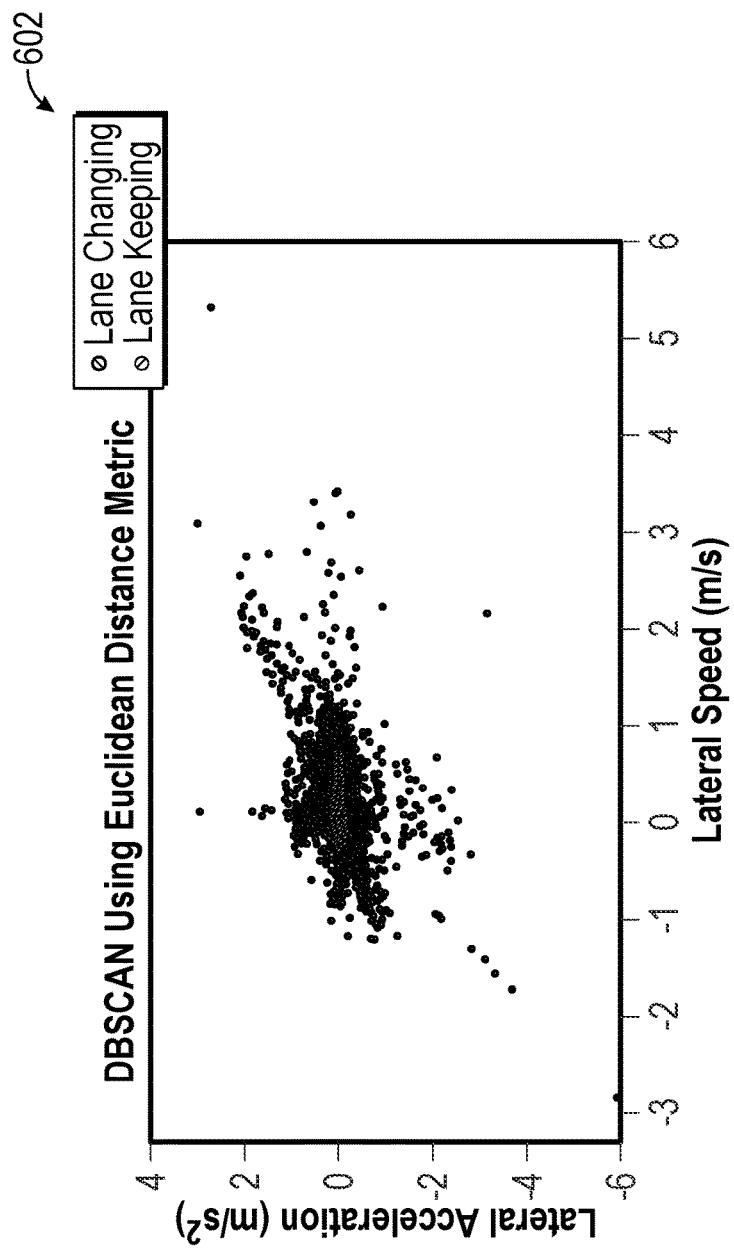
FIG. 6A is a plot illustrating clustering results for an unsupervised data labeling method in accordance with example embodiments of the disclosed technology.
Figure 6B:
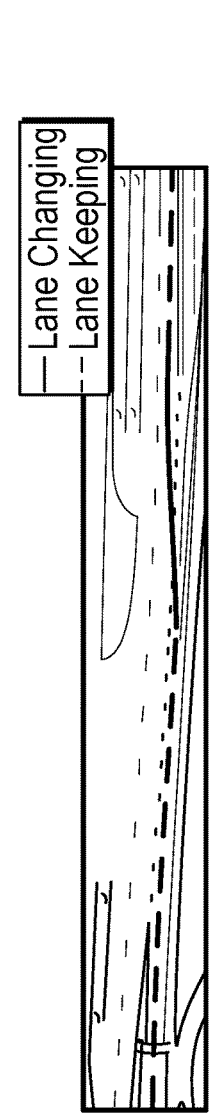
FIG. 6B illustrates data labeling for each time step as part of an unsupervised data labeling method in accordance with example embodiments of the disclosed technology.

In an example simulation that was conducted, 37 trips with lane changes and 22 trips without any lane change were performed with respect to an on-ramp/off-ramp area of the co-simulation platform 342. The average duration of each trip was 30 seconds, with an update rate of 10 Hz. The DBSCAN clustering algorithm was applied to the driving data, resulting in the labeled clustered data 602 shown in FIG. 6A. In particular, the scatter plot data 602 indicates a label (either lane change or lane keep) assigned to each time step of a vehicle state. FIG. 6B illustrates an example of a labeled trajectory 604. The labeled trajectory 604 identifies those segments of the trajectory labeled as lane keep as well as the trajectory segment labeled as lane change.

Respective cost functions were recovered for the driver's lane change behavior and the driver's lane keep behavior based on the data captured from the online validation performed on the co-simulation platform 342. The various feature values for the two cost functions are shown in the table below. It can be seen that for the lane-change behavior, the risk-related features (i.e., the car-following risk and the lane change risk) and lane change urgency contribute the most to the lane change behavior. In contrast, in the lane keep scenario, the features of lateral comfort and lane deviation are most salient.

|  | $f_{risk_f}$ | $f_{risk_{lc}}$ | $f_{urge}$ | $f_m$ | $f_{c1}$ | $f_{c2}$ | $f_d$ |
|---|---|---|---|---|---|---|---|
| $\theta_{change}$* | 0.276 | 0.278 | 0.334 | 0.047 | 0.054 | — | — |
| $\theta_{keep}$* | 0.081 | — | — | 0.012 | 0.074 | 0.599 | 0.235 |

In example embodiments of the disclosed technology, the online prediction process combines decision prediction and trajectory prediction. As shown in FIG. 3, at each time step, the current vehicle state 326 is sent into the trained network 324 for decision prediction. The example simulation referenced above utilized look-backward and look-forward windows of three seconds each, which corresponds to 30 time steps for each window. It should be appreciated that windows of different durations, and thus, different numbers of time steps may alternatively be used.

In example embodiments, the trained network 324 generates a lane change/lane keep decision prediction that guides the system 300 to the corresponding cost function 322 used to evaluate 332 the trajectory candidates 330. Then, a probability 334 of each candidate trajectory may be determined using the cost function 322, and the most probable trajectory 336 may be selected as a prediction result 340, i.e., $\hat{\xi} = max_{\tilde{\xi}_k}(P(\tilde{\xi}_k | \theta_i^*))$. The prediction result 340 may be projected back to the simulation platform 342, as shown in the visualization 702 of FIG. 7A. In addition, the lane change probability 338 may be estimated based on Eq. 12 and presented in the visualization 702.

FIG. 7B depicts a visualization 704 of the overall prediction process for the same trip represented in the visualization 702 of FIG. 7A. As shown, each time step of the ground-truth vehicle trajectory is labeled as either lane keep or lane change. The prediction result is shown as well. The visualization 704 illustrates how the lane change decision is recognized 3 seconds (i.e., 30 time steps) before the target vehicle crosses the border line between the current lane and the future lane the vehicle is changing to. Also, the zoomed-in portion of the visualization 704 shows a comparison of a 4-second horizon predicted trajectory with the ground-truth trajectory. FIG. 7C shows a visualization 706 that depicts the change in respective probability estimations for lane change and lane keep during a trip that includes a lane change maneuver.

Figure 8A:
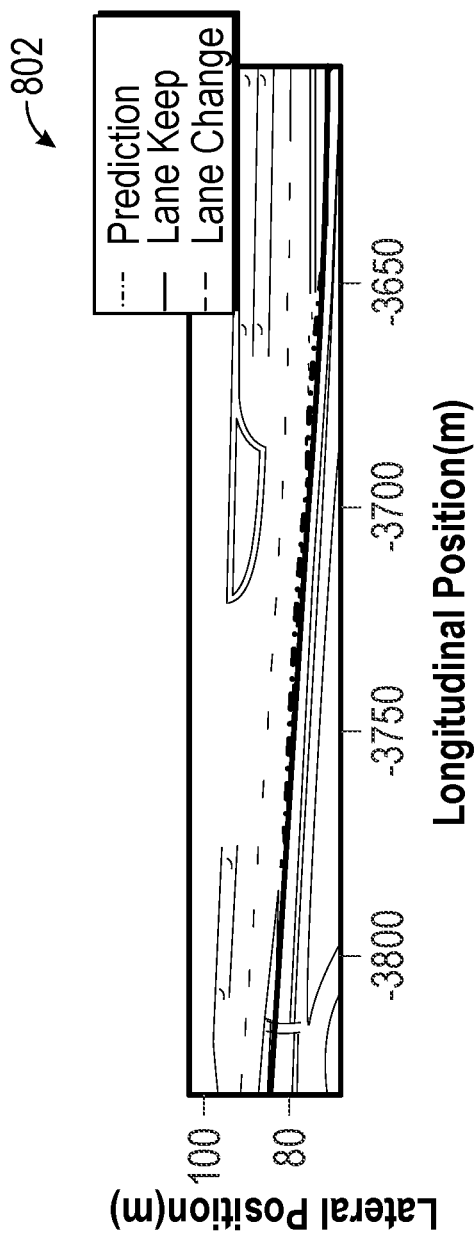
FIG. 8A illustrates another example of an overall lane change prediction process in accordance with example embodiments of the disclosed technology.
Figure 8B:
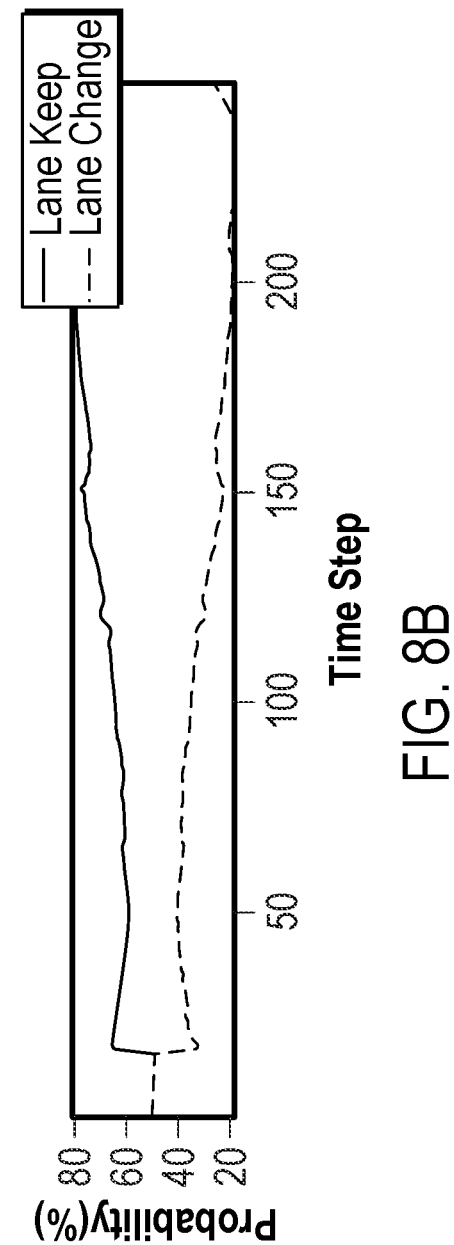
FIG. 8B illustrates another example of predicted lane change probability over time in accordance with example embodiments of the disclosed technology.

FIGS. 8A and 8B depict visualizations 802, 804, respectively, that correspond to a trip that does not include a lane change. In particular, visualization 802 illustrates a ground-truth trajectory labeled as lane keep and a prediction result that matches the ground-truth labeled trajectory. The visualization 804 of FIG. 8B illustrates how the confidence of the prediction increases as the target vehicle gets closer to the end of the lane change area. This is reflected in the increased probability for a lane keep decision as compared to the lane change decision as the time steps progress.

In some embodiments, the Mean Euclidean Distance may be used to quantify the accuracy of a predicted trajectory. More specifically, at time step t, the predicted trajectory $\hat{\xi}_t(L) = \{\widehat{xy}_t, \ldots, \widehat{xy}_{t+L}\}$ may be compared with the ground-truth trajectory $\xi_t(L) = \{xy_t, \ldots, xy_{t+L}\}$ across the same time horizon L and with the same sampling rate, as shown in the following equation:

$$m_{MED}(\hat{\xi}_t, \xi_t) = \frac{1}{L} \sum_{l=1}^{L} \|\widehat{xy}_{t+l} - xy_{t+l}\|_2, \quad \text{Eq. (13)}$$

where $xy_t = (x_t, y_t)$.

In an example simulation, the mean MED of 10 trips of the learning-based lane change prediction algorithm disclosed herein achieved 0.39 m with a 4-second prediction window, which out-performs conventional lane change prediction techniques. Moreover, the online validation phase that allows for the algorithm to be validated using a human-in-the-loop co-simulation platform 342 is a more reliable validation methodology than conventional validation techniques that rely solely on numerical simulations.

Figure 9:
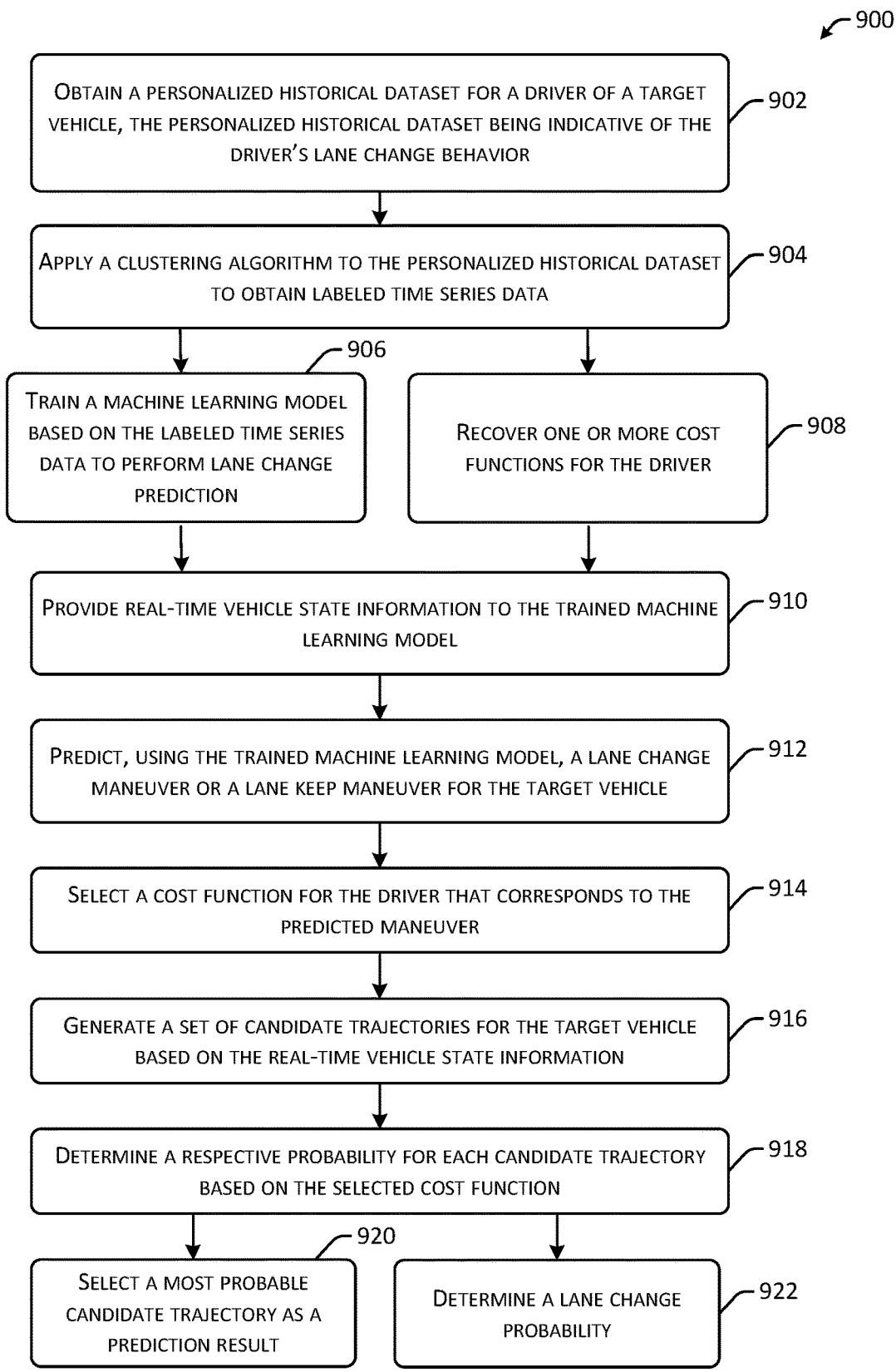
FIG. 9 is a flowchart of an illustrative method for performing learning-based lane change prediction in accordance with example embodiments of the disclosed technology.

FIG. 9 is a flowchart of an illustrative method 900 for performing learning-based lane change prediction in accordance with example embodiments of the disclosed technology. In some embodiments, the operations of the method 900 may be performed by the personalized lane change prediction control circuit 210 (FIG. 2), or more specifically, responsive to execution of the logic 205A, 205B, and/or 205C by the processor 206.

At block 902 of the method 900, a personalized historical dataset (e.g., at least a portion of the dataset 306) may be obtained for a human driver of a target vehicle. The personalized historical dataset may be captured from real-world driving behavior of the driver and/or from human driver input provided to the human-in-the-loop co-simulation platform 342. The personalized historical dataset for the driver may be indicative of historical lane change behavior of the driver.

At block 904 of the method 900, a clustering algorithm (e.g., clustering algorithm 310) such as DBSCAN may be executed on the personalized historical dataset for the driver to obtain labeled time series data (e.g., at least a portion of time series data 312). As previously described, additional morphological transformations may be performed on the labeled data to temporally relate adjacent data points in the time series.

At block 906 of the method 900, a machine learning model may be trained (e.g., training 314) based on the labeled time series data to perform lane change prediction for the driver. It should be appreciated that the ground-truth training data used to train the machine learning model may include historical driving data for multiple different drivers, in which case, the model may be trained to perform personalized and individualized lane change prediction for the different drivers. As previously described, the machine learning model may be an LSTM neural network.

In some embodiments, at least partially concurrently with training the machine learning model to perform lane change prediction, one or more cost functions for the driver may be recovered at block 908 of the method 900. The cost functions may include a first cost function corresponding to a lane change scenario for the driver and a second cost function corresponding to a lane keep scenario. Recovering the cost functions at block 908 may include determining a set of features and a corresponding set of weights to apply to the features for each of the lane change and the lane keep scenarios.

Operations 902-908 may be performed as part of an offline training phase of a learning-based lane change prediction algorithm according to embodiments of the disclosed technology. Operations 910-922 may be performed as part of an online validation phase. At block 910 of the method 900, real-time state information for the target vehicle may be provided as input to the trained lane chance prediction machine learning model. At block 912 of the method 900, the trained machine learning model (e.g., trained LSTM network) may be used to predict a lane change maneuver or a lane keep maneuver for the target vehicle. In some embodiments, the prediction at block 912 may be done for each time step over a prediction window.

At block 914 of the method 900, a cost function (e.g., cost function 322) for the driver that corresponds to the predicted maneuver may be selected. For instance, if the trained prediction model predicts a lane change maneuver, a corresponding cost function that includes features/feature weights most relevant/indicative of the lane change maneuver may be selected. Similarly, if the trained prediction model predicts a lane keep maneuver, a corresponding cost function that includes features/feature weights most relevant/indicative of the lane keep maneuver may be selected.

Then, at block 916 of the method 900, a set of candidate trajectories (e.g., candidate trajectories 330) for the target vehicle may be generated based on the real-time vehicle state information. At block 918 of the method 900, each candidate trajectory may be evaluated (e.g., evaluation 332) using the selected cost function to determine a respective probability for each candidate trajectory (e.g., respective trajectory probabilities 334).

Then, at block 920 of the method 900, a most probable candidate trajectory (e.g., most probable trajectory 336) may be selected as a prediction result (e.g., prediction result 340). And, at block 922 of the method 900—which may be performed at least partially concurrently with the operation at block 920—a lane change probability (e.g., lane change probability 338) may be determined.

As used herein, the terms circuit and component might describe a given unit of functionality that can be performed in accordance with one or more embodiments of the disclosed technology. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. After reading this description, it will become apparent to a person skilled in the relevant art how to implement the application using other computing components or architectures.

Figure 10:
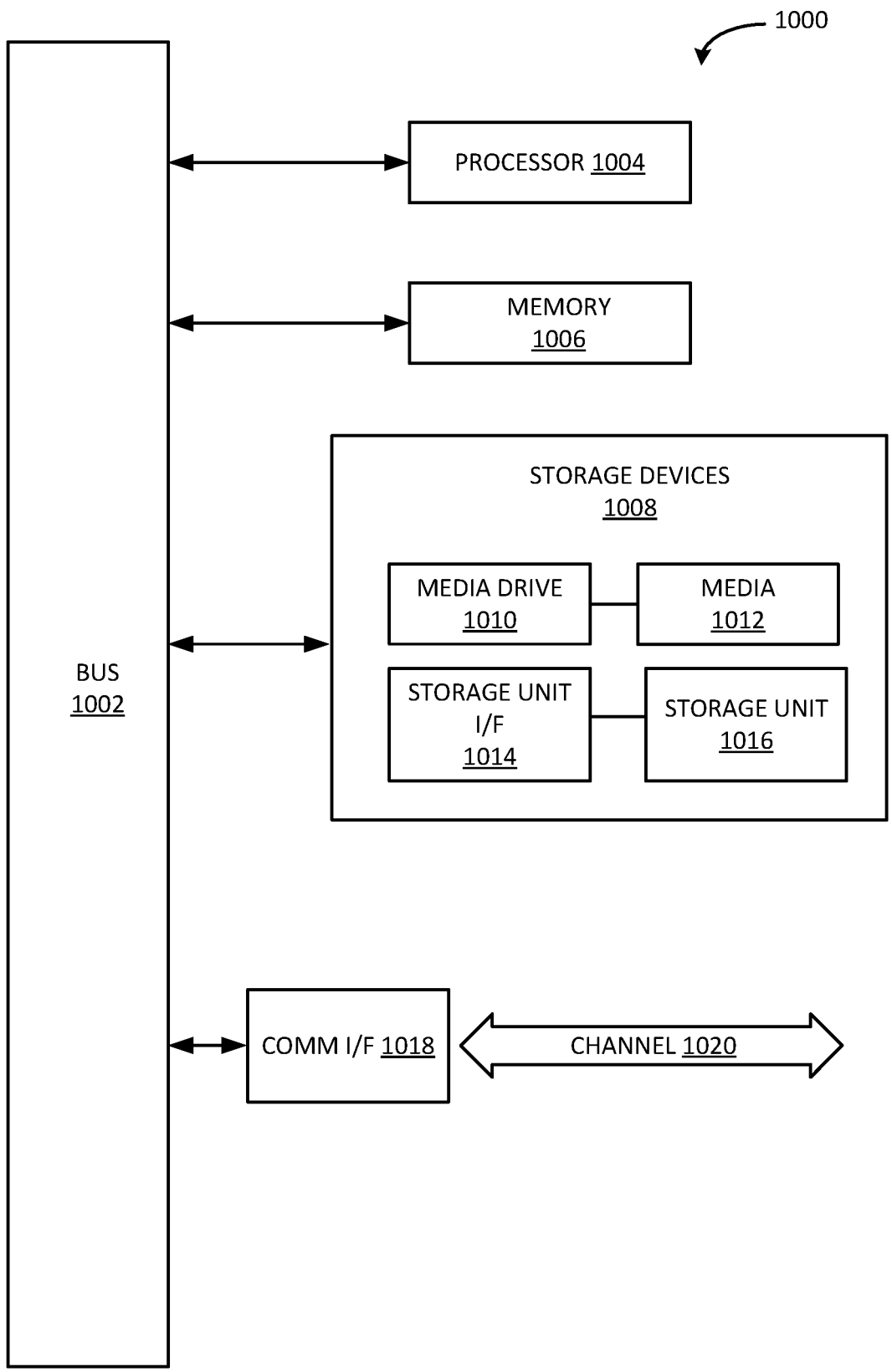
FIG. 10 is an example computing component that may be used to implement various features of embodiments of the disclosed technology.

Referring now to FIG. 10, computing component 1000 may represent an example device/system for implementing the control circuit 210 of FIG. 2. Computing component 1000 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, portable computing devices, and other electronic devices that might include some form of processing capability.

Computing component 1000 might include, for example, one or more processors, controllers, control components, or other processing devices. This can include a processor 1004, the processor 206 (FIG. 2), or the like. Processor 1004 might be implemented using a general-purpose or special-purpose processing engine such as, for example, a microprocessor, controller, or other control logic. Processor 1004 may be connected to a bus 1002. However, any communication medium can be used to facilitate interaction with other components of computing component 1000 or to communicate externally.

Computing component 1000 might also include one or more memory components, simply referred to herein as main memory 1006, which may, in example embodiments, include the memory 208 (FIG. 2). For example, random access memory (RAM) or other dynamic memory, might be used for storing information and instructions to be executed by processor 1004. Main memory 1006 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage 1008, which might include, for example, a media drive 1010 and a storage unit interface 1014. The media drive 1010 might include a drive or other mechanism to support fixed or removable storage media 1012. For example, a hard disk drive, a solid-state drive, a magnetic tape drive, an optical drive, a compact disc (CD) or digital video disc (DVD) drive (R or RW), or other removable or fixed media drive might be provided. Storage media 1012 might include, for example, a hard disk, an integrated circuit assembly, magnetic tape, cartridge, optical disk, a CD or DVD. Storage media 1012 may be any other fixed or removable medium that is read by, written to or accessed by media drive 1010. As these examples illustrate, the storage media 1012 can include a computer usable storage medium having stored therein computer software or data.

In alternative embodiments, information storage mechanism 1008 might include other similar instrumentalities for allowing computer programs or other instructions or data to be loaded into computing component 1000. Such instrumentalities might include, for example, a fixed or removable storage unit 1016 and an interface 1014. Examples of such storage units 1016 and interfaces 1014 can include a program cartridge and cartridge interface, a removable memory (for example, a flash memory or other removable memory component) and memory slot. Other examples may include a PCMCIA slot and card, and other fixed or removable storage units 1016 and interfaces 1014 that allow software and data to be transferred from storage unit 1016 to computing component 1000.

Computing component 1000 might also include a communications interface 1018. Communications interface 1018 might be used to allow software and data to be transferred between computing component 1000 and external devices. Examples of communications interface 1018 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1018 may be carried on signals, which can be electronic, electromagnetic (which includes optical) or other signals capable of being exchanged by a given communications interface 1018. These signals might be provided to communications interface 1018 via a channel 1020. Channel 1020 might carry signals and might be implemented using a wired or wireless communication medium. Some examples of a channel 1020 might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1006, storage unit 1016, media 1012, and channel 1020. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1000 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle control system, comprising:
   a personalized lane change prediction control circuit comprising:
      at least one memory storing machine-executable instructions; and
      at least one processor configured to access the at least one memory and execute the machine-executable instructions to:
         obtain historical driving data for a driver of a target vehicle;
         generate training data from the historical driving data;
         train a machine learning model based on the training data to perform lane change prediction;
         recover one or more personalized cost functions for the driver using inverse reinforcement learning;
         predict, using the trained machine learning model, a lane change-related maneuver of the target vehicle based on real-time vehicle state information associated with the target vehicle;
         determine, based on a selected cost function of the one or more personalized cost functions, a most probable trajectory for the target vehicle from a set of candidate trajectories; and
         control the target vehicle based on a personalized lane change prediction, wherein the personalized lane change prediction is generated based on the most probable trajectory.

2. The vehicle control system of claim 1, wherein the lane change-related maneuver is a lane change maneuver of the target vehicle from a current lane to an adjacent lane or a lane keep maneuver according to which the target vehicle remains in the current lane.

3. The vehicle control system of claim 2, wherein the at least one processor of the personalized lane change prediction control circuit is configured to generate the training data from the historical driving data by executing the machine-executable instructions to:

apply a clustering algorithm to the historical driving data to obtain the training data, wherein the training data includes labeled time series data, and wherein each time step of the labeled time series data comprises a first label indicative of the lane change maneuver or a second label indicative of the lane keep maneuver.

4. The vehicle control system of claim 3, wherein the at least one processor of the personalized lane change prediction control circuit is further configured to generate the training data from the historical driving data by executing the machine-executable instructions to:
apply one or more morphological operations to the labeled time series data to temporally relate adjacent labeled time steps.

5. The vehicle control system of claim 2, wherein the one or more personalized cost functions for the driver comprise a first cost function corresponding to the lane change maneuver and a second cost function corresponding to the lane keep maneuver.

6. The vehicle control system of claim 5, wherein the at least one processor of the personalized lane change prediction control circuit is configured to recover the first cost function and the second cost function by executing the machine-executable instructions to:
identify, from among a set of candidate features, a first set of features that is most predictive of the lane change maneuver;
identify, from among the set of candidate features, a second set of features that is most predictive of the lane keep maneuver;
determine a first set of feature weights to apply to the first set of features; and
determine a second set of feature weights to apply to the second set of features.

7. The vehicle control system of claim 6, wherein the first set of features and the second set of features comprise different combinations of features.

8. The vehicle control system of claim 5, wherein the at least one processor of the personalized lane change prediction control circuit is configured to execute the machine-executable instructions to:
select one of the first cost function or the second cost function based on the predicted lane change-related maneuver of the target vehicle;
determine a respective probability of each candidate trajectory based on the selected cost function; and
select the candidate trajectory with the highest respective probability as the most probable trajectory.

9. The vehicle control system of claim 1, wherein the at least one processor of the personalized lane change prediction control circuit is configured to execute the machine-executable instructions to:
determine a lane change probability for the target vehicle.

10. The vehicle control system of claim 1, wherein the at least one processor of the personalized lane change prediction control circuit is configured to execute the machine-executable instructions to:
generate additional training data from the real-time vehicle state information; and
re-train the machine learning model using the additional training data to refine the predictive capacity of the machine learning model.

11. A method, comprising:
obtaining historical driving data for a driver of a target vehicle;
generating training data from the historical driving data;
training a machine learning model based on the training data to perform lane change prediction;
recovering one or more personalized cost functions for the driver using inverse reinforcement learning;
predicting, using the trained machine learning model, a lane change-related maneuver of the target vehicle based on real-time vehicle state information associated with the target vehicle;
determining, based on a selected cost function of the one or more personalized cost functions, a most probable trajectory for the target vehicle from a set of candidate trajectories; and
controlling the target vehicle based on a personalized lane change prediction, wherein the personalized lane change prediction is generated based on the most probable trajectory.

12. The method of claim 11, wherein the lane change-related maneuver is a lane change maneuver of the target vehicle from a current lane to an adjacent lane or a lane keep maneuver according to which the target vehicle remains in the current lane.

13. The method of claim 12, further comprising generating the training data from the historical driving data by applying a clustering algorithm to the historical driving data to obtain the training data, wherein the training data includes labeled time series data, and wherein each time step of the labeled time series data comprises a first label indicative of the lane change maneuver or a second label indicative of the lane keep maneuver.

14. The method of claim 13, further comprising generating the training data from the historical driving data by applying one or more morphological operations to the labeled time series data to temporally relate adjacent labeled time steps.

15. The method of claim 12, wherein the one or more personalized cost functions for the driver comprise a first cost function corresponding to the lane change maneuver and a second cost function corresponding to the lane keep maneuver.

16. The method of claim 15, further comprising recovering the first cost function and the second cost function by:
identifying, from among a set of candidate features, a first set of features that is most predictive of the lane change maneuver;
identifying, from among the set of candidate features, a second set of features that is most predictive of the lane keep maneuver;
determining a first set of feature weights to apply to the first set of features; and
determining a second set of feature weights to apply to the second set of features.

17. The method of claim 16, wherein the first set of features and the second set of features comprise different combinations of features.

18. The method of claim 15, further comprising:
selecting one of the first cost function or the second cost function based on the predicted lane change-related maneuver of the target vehicle;
determining a respective probability of each candidate trajectory based on the selected cost function; and
selecting the candidate trajectory with the highest respective probability as the most probable trajectory.

19. The method of claim 11, further comprising determining a lane change probability for the target vehicle.

20. The method of claim 11, further comprising:
generating additional training data from the real-time vehicle state information; and re-training the machine learning model using the additional training data to refine the predictive capacity of the machine learning model.

* * * * *